United States Patent
Malta et al.

(10) Patent No.: US 12,435,986 B2
(45) Date of Patent: Oct. 7, 2025

(54) DETERMINING PICKUP AND DROP OFF LOCATIONS FOR LARGE VENUE POINTS OF INTERESTS

(71) Applicant: WAYMO LLC, Mountain View, CA (US)

(72) Inventors: Kevin Malta, San Francisco, CA (US); Bruce Mai, Sacramento, CA (US); Reed Morse, Millbrae, CA (US); Victor Chan, Mountain View, CA (US); Celia Zhang, Sunnyvale, CA (US); Jonathan Willing, Mountain View, CA (US); Shiqian Zhang, Sunnyvale, CA (US); Donghyun Kim, San Mateo, CA (US)

(73) Assignee: WAYMO LLC, Mountain View, CA (US)

( * ) Notice: Subject to any disclaimer, the term of this patent is extended or adjusted under 35 U.S.C. 154(b) by 181 days.

(21) Appl. No.: 18/131,541

(22) Filed: Apr. 6, 2023

(65) Prior Publication Data

US 2023/0324192 A1    Oct. 12, 2023

Related U.S. Application Data

(60) Provisional application No. 63/330,080, filed on Apr. 12, 2022.

(51) Int. Cl.
    *G01C 21/34*    (2006.01)
(52) U.S. Cl.
    CPC ............................. *G01C 21/3484* (2013.01)

(58) Field of Classification Search
    CPC ............ G01C 21/3484; G01C 21/3614; G01C 21/3438
    See application file for complete search history.

(56) References Cited

U.S. PATENT DOCUMENTS 9,769,616 B1 *   9/2017   Pao .................. H04W 4/023
11,268,821 B2    3/2022   Jalasutram et al.
(Continued)

FOREIGN PATENT DOCUMENTS

| WO | 2020164001 A1 | 8/2020 |
| WO | 2021087663 A1 | 5/2021 |
| WO | 2021188039 A1 | 9/2021 |

*Primary Examiner* — Khoi H Tran
*Assistant Examiner* — Nhi Q Bui
(74) *Attorney, Agent, or Firm* — Botos Churchill IP Law LLP

(57) ABSTRACT

Aspects of the disclosure provide for generating and using a model for identifying a plurality of pick up or drop off locations for a large venue point of interest. For instance, a large venue point of interest may be identified. The plurality may be identified for the large venue point of interest based on a combination of historical trip data and map information. The plurality may be associated with the large venue point of interest. The association may be stored in memory for later use. Thereafter, a request for a trip identifying the large venue point of interest may be received from a client computing device, and the plurality may be provided to the client computing device in response to the request. A pickup and drop off location of the plurality may be provided to an autonomous vehicle in order to cause the autonomous vehicle to transport a passenger to the pickup or drop off location.

21 Claims, 15 Drawing Sheets

(56) References Cited

U.S. PATENT DOCUMENTS

| | | | |
|---|---|---|---|
| 2007/0112510 A1* | 5/2007 | Ogawa | G01C 21/3605 |
| | | | 701/438 |
| 2018/0342157 A1* | 11/2018 | Donnelly | G08G 1/205 |
| 2019/0063935 A1* | 2/2019 | Badalamenti | G06Q 50/40 |
| 2019/0186933 A1* | 6/2019 | Greenberg | G01C 21/3644 |
| 2020/0103242 A1* | 4/2020 | Chachra | G06F 16/29 |
| 2021/0073728 A1* | 3/2021 | Yu | G06Q 10/0836 |

* cited by examiner

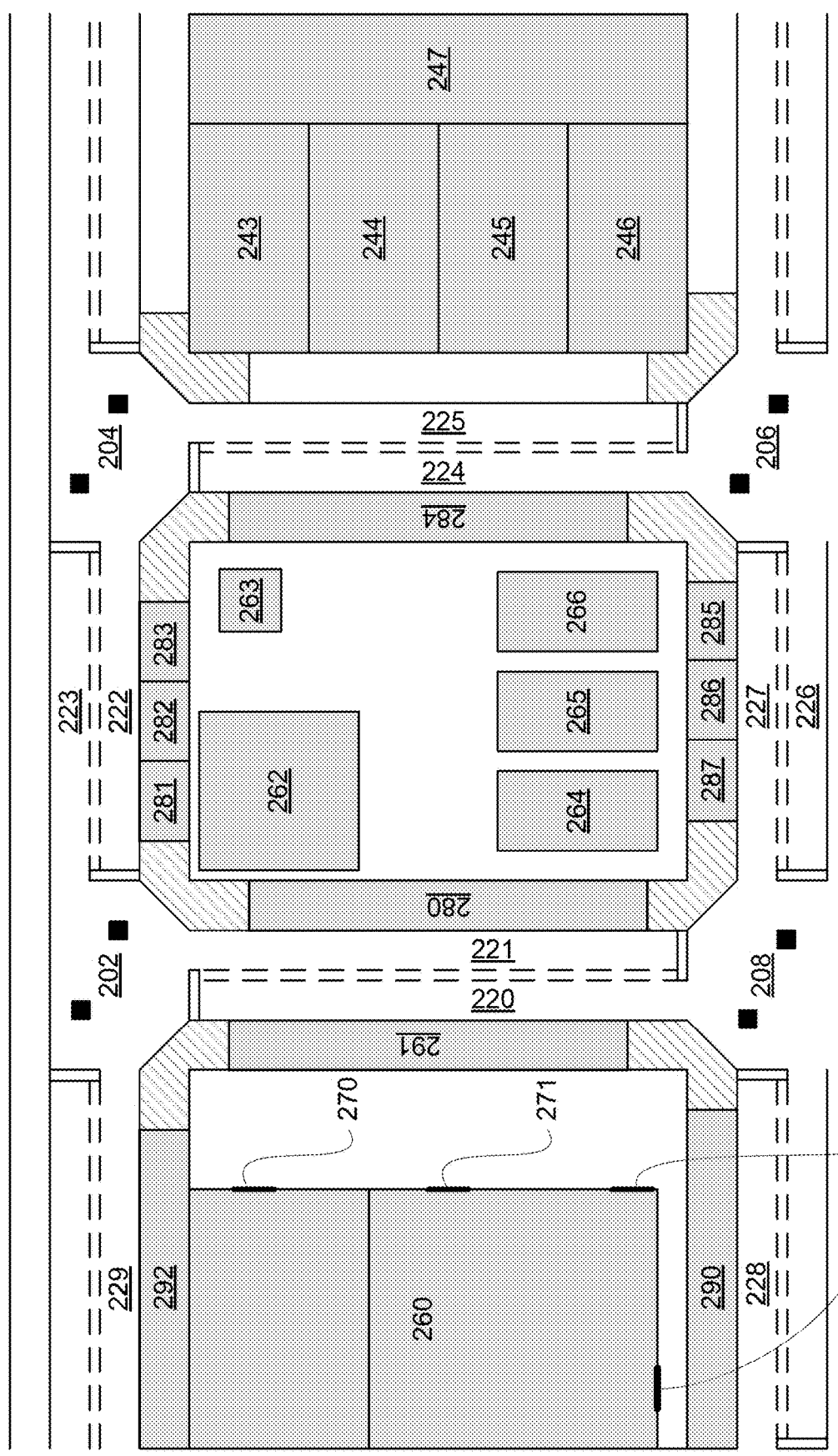

DETERMINING PICKUP AND DROP OFF LOCATIONS FOR LARGE VENUE POINTS OF INTERESTS

CROSS REFERENCE TO RELATED APPLICATIONS

The present application claims the benefit of the filing date of U.S. Provisional Application No. 63/330,080, filed Apr. 12, 2022, the entire disclosure of which is incorporated by reference herein.

BACKGROUND

Autonomous vehicles for instance, vehicles that may not require a human driver, can be used to aid in the transport of passengers or items from one location to another. Such vehicles may operate in a fully autonomous mode where passengers may provide some initial input, such as a pickup or destination location, and the autonomous vehicle maneuvers itself to that location. Autonomous vehicles are equipped with various types of sensors in order to detect objects in the surroundings. For example, autonomous vehicles may include sonar, radar, camera, lidar, and other devices that scan, generate and/or record data about the vehicle's surroundings in order to enable the autonomous vehicle to plan trajectories in order to maneuver itself through the surroundings.

BRIEF SUMMARY

Aspects of the disclosure provide a method of generating a model for identifying a plurality of pick up or drop off locations for a large venue point of interest. The method includes identifying, by one or more processors of one or more server computing devices, the large venue point of interest from a plurality of points of interest defined in map information; identifying, by the one or more processors, the plurality of pick up or drop off locations for the large venue point of interest based on a combination of historical trip data and the map information; associating, by the one or more processors, the plurality of pick up or drop off locations with the large venue point of interest; and storing, by the one or more processors, the association in memory for later use.

In one example, the large venue point of interest is identified based on a categorization of the large venue point of interest in the map information. In another example, the large venue point of interest is identified based on a size of a polygon associated with the large venue point of interest in the map information. In this example, the polygon includes a building footprint. Alternatively, the polygon is a bounding polygon for the large venue point of interest. In addition, or alternatively, the large venue point of interest is identified further based on dimensions of the polygon. In another example, the large venue point of interest is further identified based on the historical trip data. In another example, the large venue point of interest is further identified based on historical trip data including whether users have requested a particular pick up location or destination location for the large venue point of interest and adjusted the particular pick up or destination location. In another example, the large venue point of interest is further identified based on the historical trip data including ratings for pick up and drop off experiences for the large venue point of interest, and wherein the large venue point of interest is further identified based on the ratings. In another example, the historical trip data includes ratings for pick up or drop off locations for the large venue point of interest. In this example, the ratings relate to safety. In addition, or alternatively, the ratings relate to lighting conditions. In another example, the historical trip data includes timing of drop offs and pickups for the large venue point of interest. In another example, the historical trip data includes a level of difficulty for an autonomous vehicle to complete a drop off or pick up for the large venue point of interest. In another example, the historical trip data includes pick up and drop off locations for the large venue point of interest most often requested by users. In another example, the plurality of pick up or drop off locations are identified based on a polygon associated with the large venue point of interest in the map information. In another example, the map information identifies designated loading zone for the large venue point of interest. In another example, a number of pick up or drop off locations included in the plurality of pick up and drop off locations is based on characteristics of a polygon associated with the large venue point of interest in the map information. In another example, a number of pick up or drop off locations included in the plurality of pick up and drop off locations is based on a number of access points associated with the large venue point of interest in the map information. In another example, the method also includes receiving, from a client computing device, a request for a trip identifying the large venue point of interest and providing, to the client computing device, the plurality of pick up and drop off locations to the client computing device in response to the request.

BRIEF DESCRIPTION OF THE DRAWINGS

FIGS. 2A-2D are an example of map information in accordance with aspects of the disclosure.

DETAILED DESCRIPTION

Overview

Figure 1:
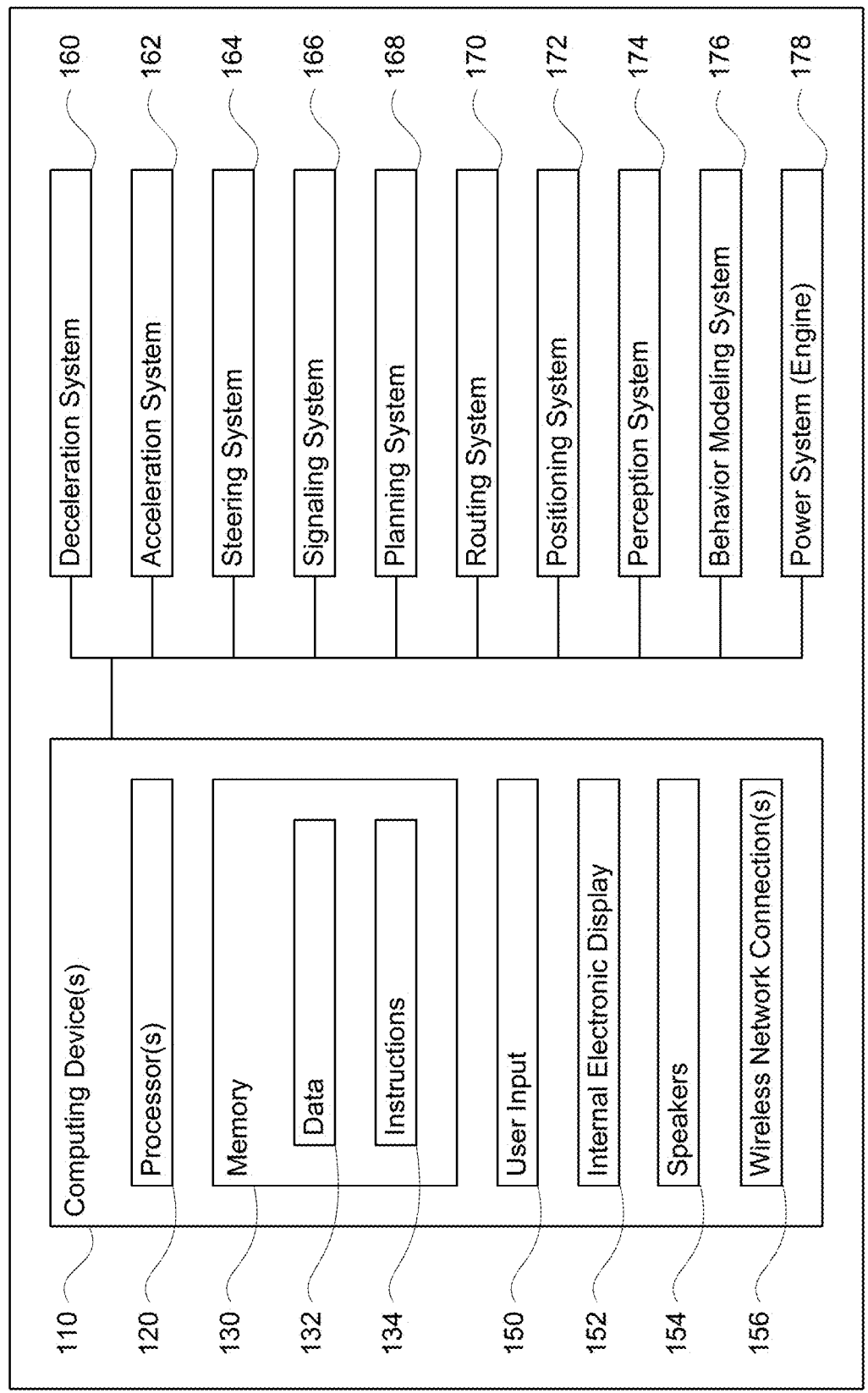
FIG. 1 is a functional diagram of an example vehicle in accordance with an exemplary embodiment.

The technology relates to enabling users of an autonomous vehicle transportation service to select one of a plurality of pickup and/or drop off locations for large venues. Such large venues may include large parks, airports, malls, neighborhoods which may include multiple access points. While prior efforts for identifying pick up or drop off locations for large venues may have been performed manually, the features described herein may enable an automated process for such efforts thereby increasing efficiency and usefulness of the information.

In order to do so, one or more server computing devices may process map information in order to identify large venues points of interest which may have multiple access points. This may involve identifying points of interest with certain types of identifiers. For example, points of interest in the map information that have certain categorizations may be identified. Each of these identified large venue points of interest may be associated with a polygon bounding the large venue point of interest. In some instances, such points of interest may be associated with polygons representing the footprint of buildings. Such categorizations may include, for example, large parks, airports, malls, points of interest with particularly large polygons, etc. In still other instances, the server computing devices may identify large non-drivable areas associated with a plurality of businesses.

Other large venues may be identified based on historical trip data. For example, large venue points of interest may also be identified based on whether users have requested a particular pickup location or destination location and adjusted the pick up or drop off location at different points around the requested location or were dropped off at different points. For another example, large venue points of interest may also be identified based on whether passengers provide both high and low ratings for pickup and drop off experiences very close to the same location as this might suggest that some users were dropped off or picked up farther or closer to the desired location.

Once the large venue points of interest are identified, a plurality of pick up or drop off locations may be identified or selected. The plurality of pick up or drop off locations for a given large venue point of interest may be identified based on the historical trip data. For example, pickup and drop off locations for a given large venue point of interest with higher user ratings may be identified. In addition, or alternatively, pickup and drop off locations for the given large venue point of interest which resulted in the fastest pickups and drop offs or those that were least difficult or complicated for the autonomous vehicles in the past may be identified. In addition, or alternatively, pickup and drop off locations most often requested by users for a given large venue point of interest may be identified.

The plurality of pick up or drop off locations for a given large venue point of interest may be identified based on the map information. In addition, or alternatively, the plurality of pick up or drop off locations for a given large venue point of interest may be identified based on sensor data generated by perception systems of the autonomous vehicles. In addition, or alternatively, the plurality of pick up or drop off locations for a given large venue point of interest may be determined based on metrics for quantifying how good a particular location is for a pick up or drop off according to any of the features for identifying pickup and drop off locations identified above.

The number of pickup and drop off locations identified for the plurality may be limited. Such limits may be based on the number of sides of the polygons, the walking or other distances between the identified pick up or drop off locations, attributes of the large venue point of interest, walking distances to locations within the polygon, the number of known access points, clustering logic based on distance, etc.

This plurality of pick up or drop off locations may be associated with the large venue point of interest and saved in the map information. In this regard, once a user requests a trip from or to a large venue point of interest associated with such a plurality, the user's client computing device may be provided with a list of pick up or drop off location options for that large venue point of interest. The options may be provided with a map and a scrollable list of options where each spot includes a name, image (e.g., photograph, satellite image, or other type of image), and attributes that a user can browse and select from. In this regard, for the same large venue, a user may be provided with a list of the "best" pickup and drop off locations.

The aforementioned attributes may include information identifying the benefits of each location. In this regard, the attributes may include contextual information about how each location may affect the passenger's trip in the form of routing or timing information, such as an estimated time of arrival for a pickup up and/or later drop off. In addition, or alternatively, additional information such as street-level images or 3D models of the area around the large venue point of interest may also be provided.

Once the user has selected and/or confirmed a pick up or drop off location for a trip, the server computing devices may send a signal to an autonomous vehicle to cause the autonomous vehicle to navigate to the pick up or drop off locations in an autonomous driving mode.

As noted above, the features described herein may enable users of an autonomous vehicle transportation service to select one of a plurality of pickup and/or drop off locations for large venues. In addition, the features described herein may enable an automated process for such efforts thereby increasing efficiency and usefulness of the information. For instance, in addition to the information presented to passengers on client computing devices, the information about large venues may be used to optimize our service for more timely pickups and drop offs of passengers (or potentially goods). Additional benefits may include shorter estimated time of arrivals for pickups and destination, shorter walking times, shorter waiting times for autonomous vehicles during a pickup or drop off, stopping for pickups and drop offs closer to entrances, exits, curb cuts, within well-lit and in some instances more highly-trafficked (e.g., by pedestrians) and potentially safer.

Example Systems

As shown in FIG. 1, an autonomous vehicle 100 in accordance with one aspect of the disclosure includes various components. Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. An autonomous vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified different levels to indicate how much, or how little, a vehicle controls the driving, although different organizations may categorize the levels differently. Moreover, such classifications may change (e.g., be updated) overtime.

As described herein, in a semi or partially autonomous driving mode, even though the vehicle assists with one or more driving operations (e.g., steering, braking and/or accelerating to perform lane centering, adaptive cruise control or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode.

While certain aspects of the disclosure are particularly useful in connection with specific types of vehicles, the vehicle may be any type of vehicle including, but not limited to, cars, trucks (e.g., garbage trucks, tractor-trailers, pickup trucks, etc.), motorcycles, buses, recreational vehicles, street cleaning or sweeping vehicles, etc. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor 120. The memory 130 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs or GPUs. Alternatively, the one or more processors may include a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more of a button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, internal display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 110 may be part of an autonomous control system for the autonomous vehicle 100 and may be capable of communicating with various components of the vehicle in order to control the vehicle in an autonomous driving mode. For example, returning to FIG. 1, computing devices 110 may be in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 in order to control the movement, speed, etc. of autonomous vehicle 100 in accordance with the instructions 134 of memory 130 in the autonomous driving mode.

As an example, computing devices 110 may interact with deceleration system 160 and acceleration system 162 in order to control the speed of the vehicle. Similarly, steering system 164 may be used by computing devices 110 in order to control the direction of autonomous vehicle 100. For example, if autonomous vehicle 100 is configured for use on a road, such as a car or truck, steering system 164 may include components to control the angle of wheels to turn the vehicle. Computing devices 110 may also use the signaling system 166 in order to signal the vehicle's intent to other drivers or vehicles, for example, by lighting turn signals or brake lights when needed.

Routing system 170 may be used by computing devices 110 in order to generate a route to a destination location using map information. Planning system 168 may be used by computing device 110 in order to generate short-term trajectories that allow the vehicle to follow routes generated by the routing system. In this regard, the planning system 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device), pullover spots, vegetation, or other such objects and information.

Figure 2A:
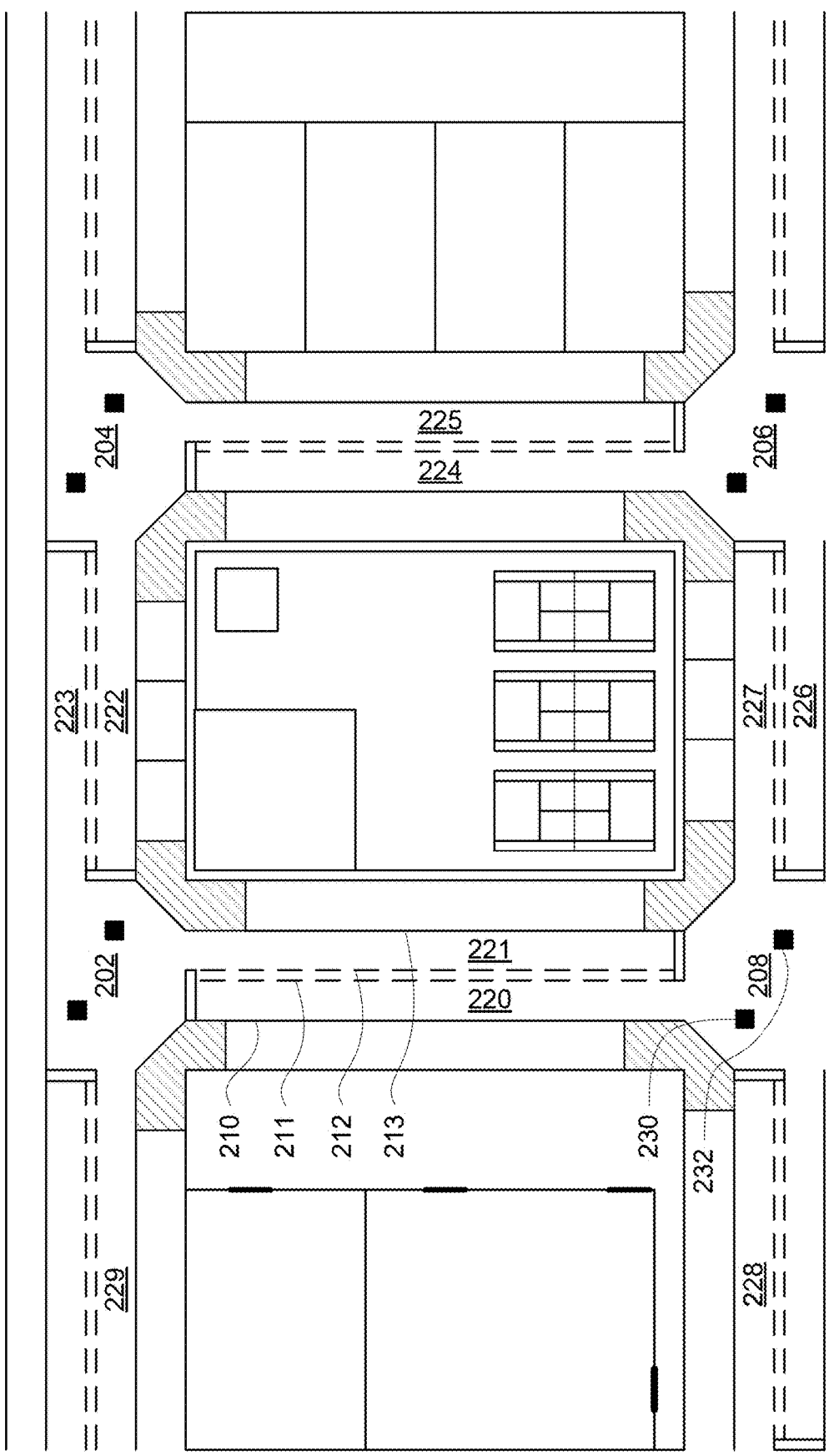

FIGS. 2A-2D is an example of map information 200 for a geographic location corresponding to a few city blocks including intersections 202, 204, 206, 208. FIG. 2A depicts a portion of the map information 200 that includes information identifying the shape, location, and other characteristics of lane markers or lane lines 210 (fog line), 211 (dashed yellow line), 212 (dashed yellow line), 213 (fog line), and so on which define the boundaries of lanes 220, 221, 222, 223, 224, 225, 226, 227, 228, 229, and so on. In this example, the map information also includes other features of the intersections such as traffic control devices including traffic signal lights 230, 232 and so on. In addition to the aforementioned features and information, the map information may also include information that identifies the direction of traffic for each lane as well as information that allows the computing devices 110 to determine whether the vehicle has the right of way to complete a particular maneuver (i.e., complete a turn or cross a lane of traffic or intersection). In this regard, the map information 200 may identify various features which the autonomous vehicle 100's systems may use to localize the autonomous vehicle as well as to generate routes to a destination and trajectories to follow in order to reach that destination.

The map information 200 may also include a plurality of points of interest. These points of interest may be associated with (and therefore indexed by) proper names, street addresses, location coordinates, categorizations (such as key words, phrases, tags, etc.), etc. For example, turning to FIG. 2B, the shaded areas represent points of interest in the map information including a shopping center 240, a park 241, and various businesses 243, 244, 245, 246, 247. The shopping center 240 may be associated with a proper name (e.g., "Shopping Plaza"), a street address (e.g., 120 First Avenue, Anytown, Anystate 00001), location coordinates (e.g., latitude and longitude coordinates or other geographic coordinates), categorizations (e.g., "shopping", "clothing store", "grocery store", "places to buy snacks", etc.), and so on. The park 242 may be associated with a proper name (e.g., "Tennis Park"), a street address (e.g., 123 First Avenue, Anytown, Anystate 00001), location coordinates (e.g., latitude and longitude coordinates or other geographic coordinates), categorizations (e.g., "tennis", "playground", "tennis courts", "places to play tennis", etc.), and so on. Similarly, each of businesses 243, 244, 245, 246, 247 may be associated with a proper name (e.g., "Restaurant A", "The Coffee Shoppe", "The Antique Store", "The Sporting Goods Store" etc.), a street address (e.g., 121 Second Avenue, Anytown, Anystate 00001, etc.), location coordinates (e.g., latitude and longitude coordinates or other geographic coordinates), categorizations (e.g., "shopping", "restaurant", "fast food", "places to buy sporting equipment", etc.), and so on. Other example categorizations may include airports, malls, neighborhoods (e.g., "Mission District" or "Fisherman's Wharf"), etc. In this regard, categorizations can include those that are larger than the point of interest itself (e.g., a home may be associated with a categorization and/or a polygon for the neighborhood in which the home is located).

Figure 2B:
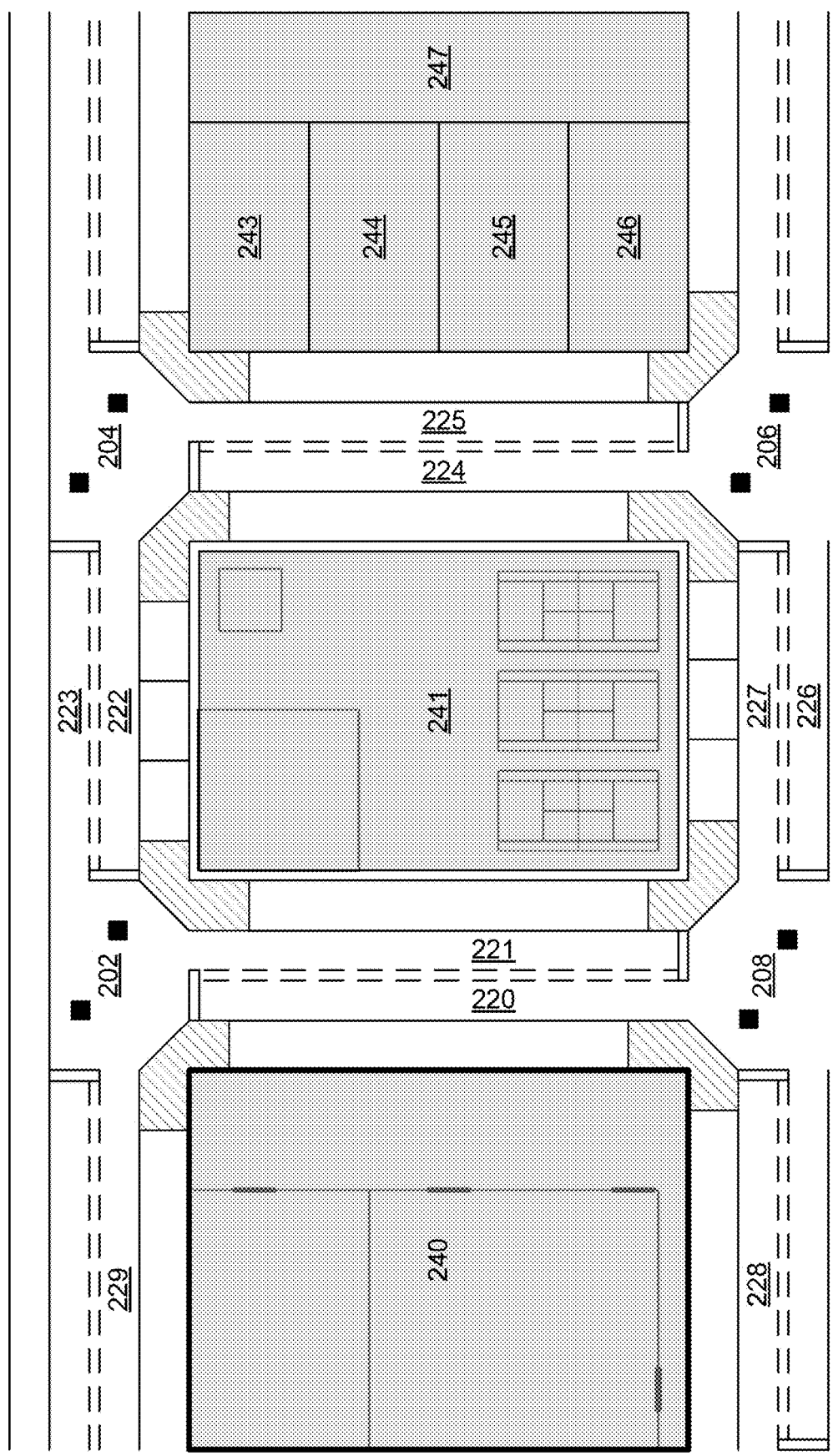
Figure 2C:
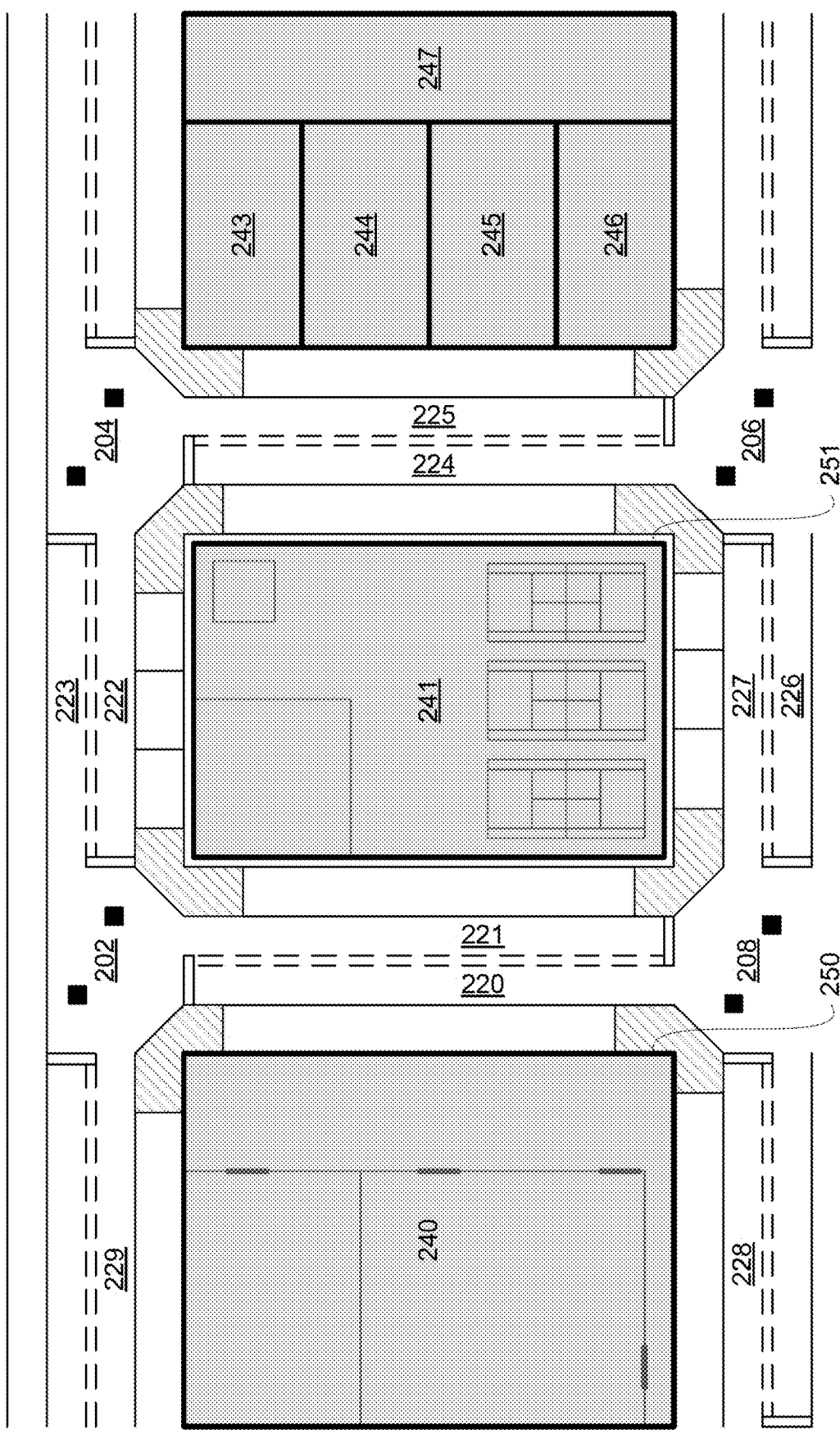

Each of these points of interest may be associated with a polygon bounding the point of interest ("bounding polygon"). For instance, turning to FIG. 2C, each of the points of interest of FIG. 2B is bounded by a polygon. For example, the shopping center 240 is bounded by polygon 250, the park is bounded by polygon 251, and so on. Each bounding polygon may be defined by its vertices (e.g., via geolocation coordinates) as well as its overall area or size.

In some instances, such points of interest may be associated with internal polygons representing the foot print of buildings or other structures ("internal polygon". Turning to FIG. 2D, the shopping center 240 is associated with a polygon corresponding to a building footprint of polygon 260, and the park 241 is associated with polygons corresponding to a footprint of a playground area (polygon 262), a building footprint (polygon 263), and footprints of tennis courts (polygons 264, 265, 266). Such internal polygons may alternatively be included in the map information as larger, non-drivable areas associated with a plurality of businesses such as in the case of the shopping center 240. In some instances, the map information may also identify the location of building entrances, such as building entrances 270, 271, 272, 273 as in the example of the building footprint of polygon 260.

The map information 200 may also identify pullover locations which may include areas where a vehicle is able to stop and to pick up or drop off passengers or cargo. These areas may correspond to parking spaces, waiting areas, shoulders, parking lots, etc. For instance, FIG. 2D depicts parking areas 280, 281, 282, 283, 284, 285, 286, 287, 290, 291, 292. For simplicity, these pullover locations may correspond to larger parking areas (without specifically delineated parking spaces) such as parking area 280, 284, 290, 291, 292 as well as parking spaces such as parking areas 281, 282, 283, 285, 286, 287. In this regard, the parking areas in the map information may correspond to any type of area in which a vehicle is able to stop to pick up and drop off passengers or cargo. In this regard, the predetermined pullover locations may be determined using heuristics, such as every 1 meter or more or less within a designated parking area and may be updated periodically, for instance every week or more or less, based on locations where vehicles of the fleet or other vehicles are observed being stopped or pulled over.

Although not depicted in detail or called out in the example of map information 200, the map information may also identify certain designated areas, such as no parking zones, congestion zones, loading zones, drop off or pick up zones (e.g., for airports or train stations), curb cuts (i.e., areas in a curb that allow a wheel chair, bicycle, stroller or other wheeled device to pass through easily).

The map information may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g., latitude, longitude, altitude, etc.), an ending graph node having a specific geographic location (e.g., latitude, longitude, altitude, etc.), and a direction. This direction may refer to a direction the autonomous vehicle 100 must be moving in in order to follow the edge (i.e., a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 166 may use the aforementioned map information to determine a route from a current location (e.g., a location of a current node) to a destination location. Routes may be generated using a cost-based analysis which attempts to select a route to the destination location with the lowest cost. Costs may be assessed in any number of ways such as time to the destination location, distance traveled (each edge may be associated with a cost to traverse that edge), types of maneuvers required, convenience to passengers or the vehicle, etc. Each route may include a list of a plurality of nodes and edges which the vehicle can use to reach the destination location. Routes may be recomputed periodically as the vehicle travels to the destination location.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g., because it is faster) and therefore be preferable.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it, which can often be determined with less noise than the absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 174 also includes one or more components for detecting objects external to the vehicle such as other road users (vehicles, pedestrians, bicyclists, etc.) obstacles in the roadway, traffic signals, signs, trees, buildings, etc. For example, the perception system 174 may include Lidars, sonar, radar, cameras, microphones and/or any other detection devices that generate and/or record data which may be processed by the computing devices of computing devices 110. In the case where the vehicle is a passenger vehicle such as a minivan or car, the vehicle may include Lidar, cameras, and/or other sensors mounted on or near the roof, fenders, bumpers or other convenient locations.

Figure 3A:
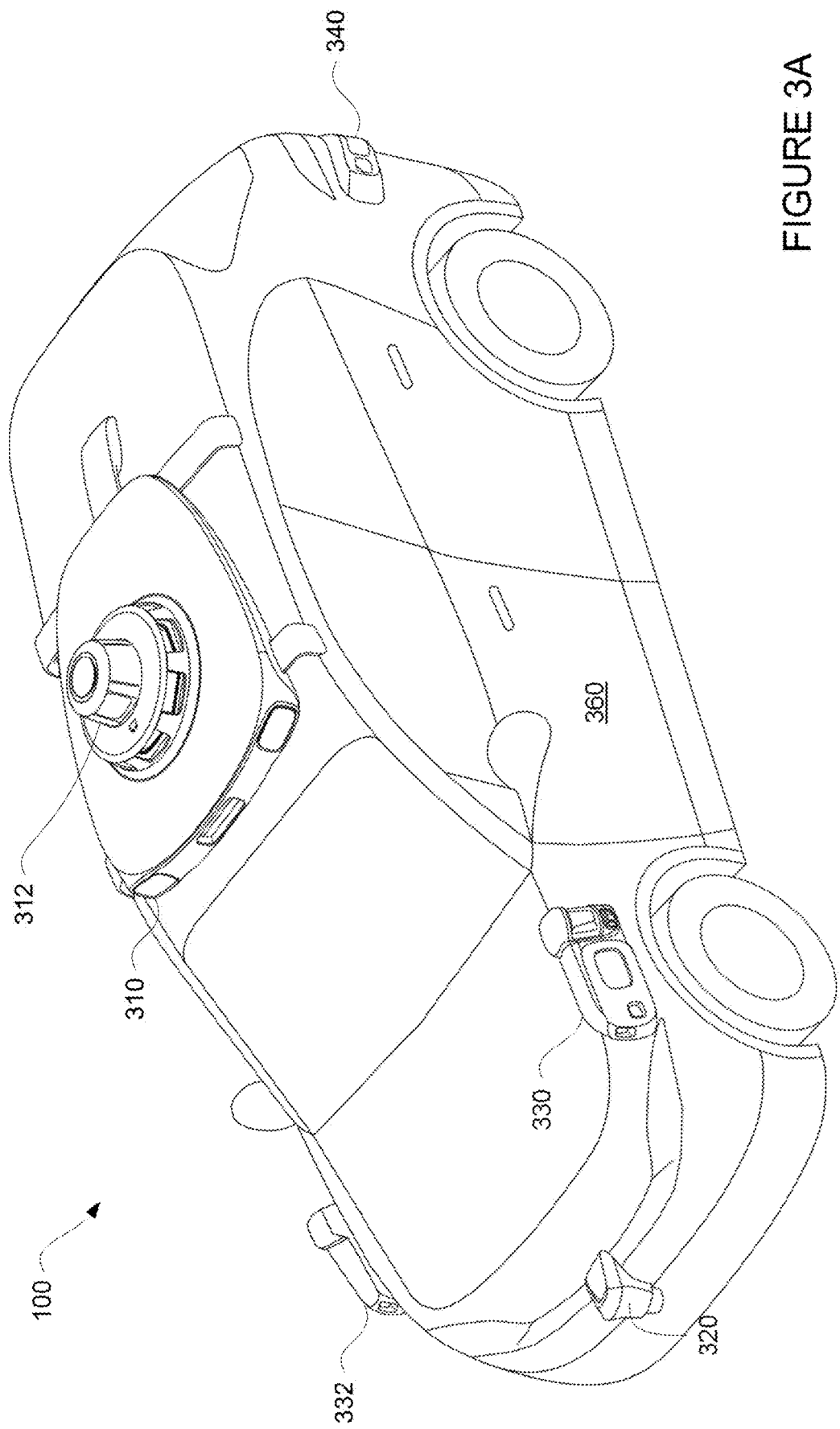
FIG. 3A-3B are example external views of a vehicle in accordance with aspects of the disclosure.
Figure 3B:
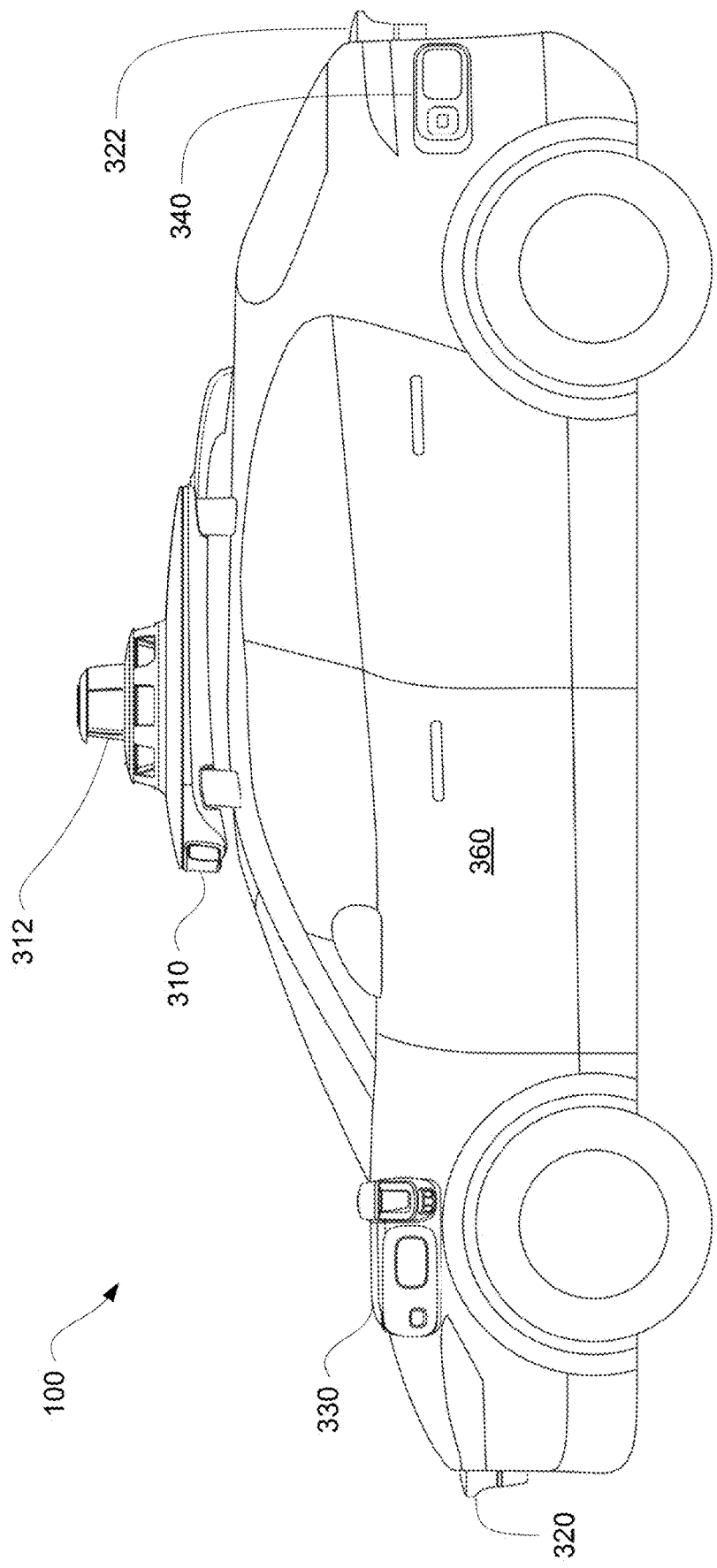

For instance, FIGS. 3A-3B are an example external views of autonomous vehicle 100. In this example, roof-top housing 310 and upper housing 312 may include a Lidar sensor as well as various cameras and radar units. Upper housing 312 may include any number of different shapes, such as domes, cylinders, "cake-top" shapes, etc. In addition, housing 320, 322 (shown in FIG. 3B) located at the front and rear ends of autonomous vehicle 100 and housings 330, 332 on the driver's and passenger's sides of the vehicle may each store a Lidar sensor and, in some instances, one or more cameras. For example, housing 330 is located in front of driver door 360. Autonomous vehicle 100 also includes a housing 340 for radar units and/or cameras located on the driver's side of the autonomous vehicle 100 proximate to the rear fender and rear bumper of autonomous vehicle 100. Another corresponding housing (not shown may also arranged at the corresponding location on the passenger's side of the autonomous vehicle 100. Additional radar units and cameras (not shown) may be located at the front and rear ends of autonomous vehicle 100 and/or on other positions along the roof or roof-top housing 310.

Computing devices 110 may be capable of communicating with various components of the vehicle in order to control the movement of autonomous vehicle 100 according to primary vehicle control code of memory of computing devices 110. For example, returning to FIG. 1, computing devices 110 may include various computing devices in communication with various systems of autonomous vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of autonomous vehicle 100 in accordance with the instructions 134 of memory 130.

The various systems of the vehicle may function using autonomous vehicle control software in order to determine how to control the vehicle. As an example, a perception system software module of the perception system 174 may use sensor data generated by one or more sensors of an autonomous vehicle, such as cameras, Lidar sensors, radar units, sonar units, etc., to detect and identify objects and their characteristics. These characteristics may include location, type, heading, orientation, speed, acceleration, change in acceleration, size, shape, etc.

In some instances, characteristics may be input into a behavior prediction system software module of the behavior modeling system 176 which uses various behavior models based on object type to output one or more behavior predictions or predicted trajectories for a detected object to follow into the future (e.g., future behavior predictions or predicted future trajectories). In this regard, different models may be used for different types of objects, such as pedestrians, bicyclists, vehicles, etc. The behavior predictions or predicted trajectories may be a list of positions and orientations or headings (e.g., poses) as well as other predicted characteristics such as speed, acceleration or deceleration, rate of change of acceleration or deceleration, etc.

In other instances, the characteristics from the perception system 174 may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle.

Detected objects, predicted trajectories, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate planned trajectories for the vehicle to follow for some brief period of time into the future based on a route generated by a routing module of the routing system 170. Each planned trajectory may provide a planned path and other instructions for an autonomous vehicle to follow for some brief period of time into the future, such as 10 seconds or more or less. In this regard, the trajectories may define the specific characteristics of acceleration, deceleration, speed, direction, etc. to allow the vehicle to follow the route towards reaching a destination location. A control system software module of computing devices 110 may be configured to control movement of the vehicle, for instance by controlling braking, acceleration and steering of the vehicle, in order to follow a trajectory.

The computing devices 110 may control the vehicle in one or more of the autonomous driving modes by controlling various components. For instance, by way of example, computing devices 110 may navigate the vehicle to a destination location completely autonomously using data from the detailed map information and planning system 168. Computing devices 110 may use the positioning system 170 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of autonomous vehicle 100 by steering system 164), and signal such changes (e.g., by lighting turn signals) using the signaling system 166. Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
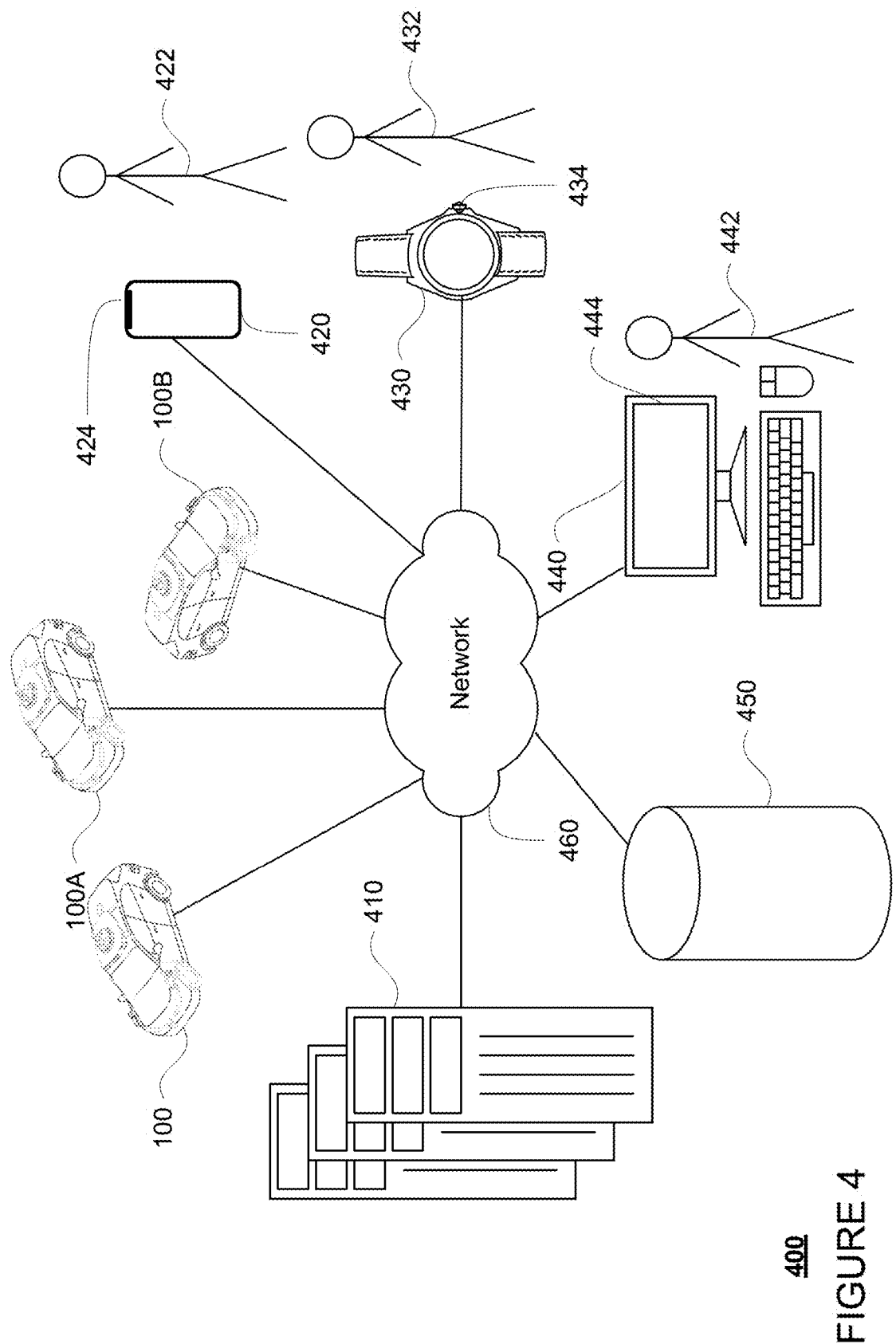
FIG. 4 is a pictorial diagram of an example system in accordance with aspects of the disclosure.
Figure 5:
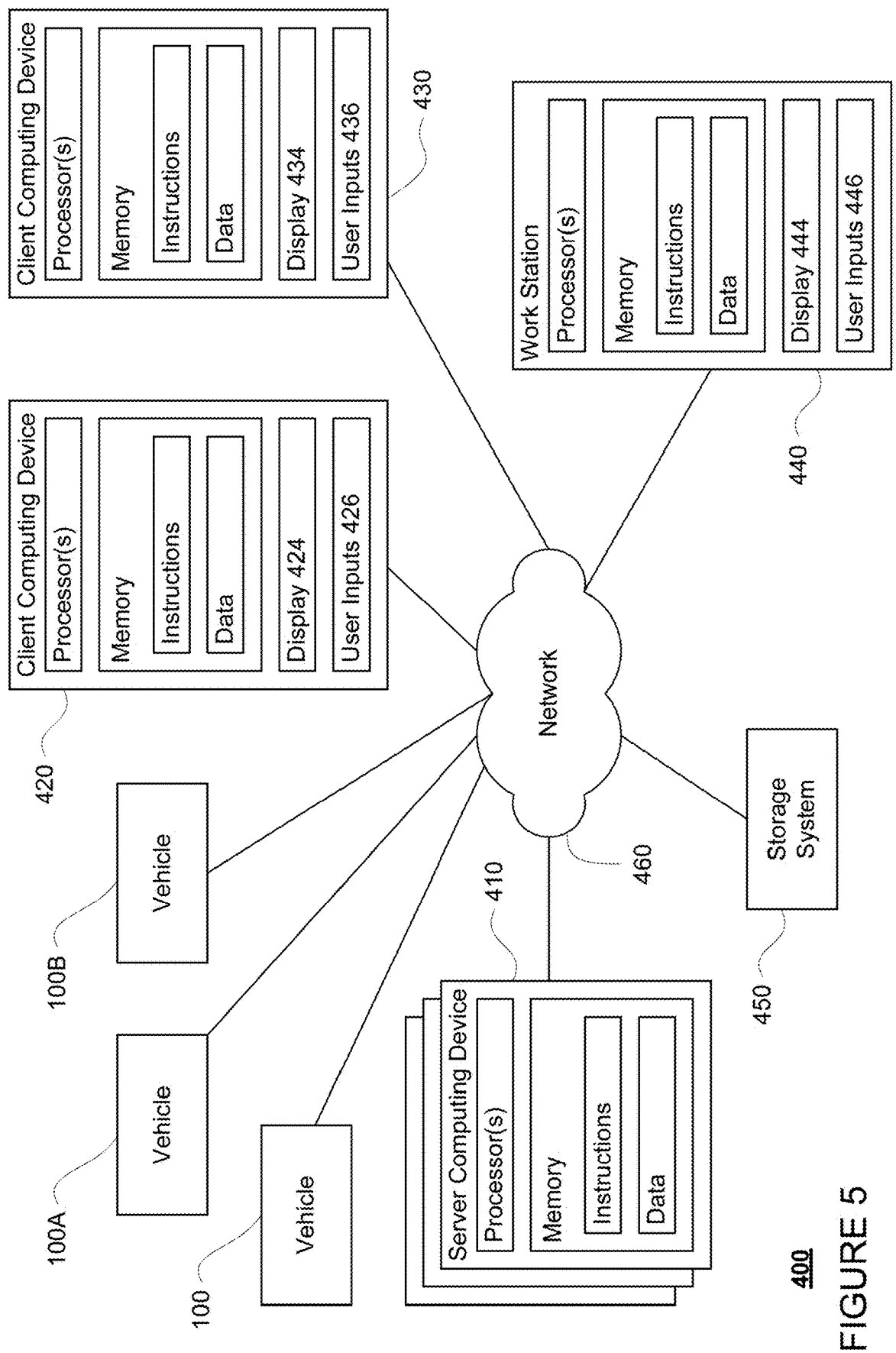
FIG. 5 is a functional diagram of the system of FIG. 4 in accordance with aspects of the disclosure.

Computing device 110 of autonomous vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes autonomous vehicle 100A and autonomous vehicle 100B, which may be configured the same as or similarly to autonomous vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of autonomous vehicle 100 or a similar computing device of autonomous vehicle 100A or autonomous vehicle 100B as well as computing devices 420, 430, 440 via the network 460. For example, autonomous vehicles 100, 100A, 100B, may be a part of a fleet of vehicles that can be dispatched by server computing devices to various locations. In this regard, the server computing devices 410 may function as a scheduling system which can be used to arrange trips for passengers by assigning and dispatching vehicles such as autonomous vehicles 100, 100A, 100B. These assignments may include scheduling trips to different locations in order to pick up and drop off those passengers. In this regard, the server computing devices 410 may operate using scheduling system software in order to manage the aforementioned autonomous vehicle scheduling and dispatching. In addition, the computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430 may be a personal computing device intended for use by a user 422, 432 and have all of the components normally used in connection with a personal computing device including a one or more processors (e.g., a central processing unit (CPU)), memory (e.g., RAM and internal hard drives)

storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, such as a wristwatch as shown in FIG. 3. As an example, the user may input information using a small keyboard, a keypad, microphone, using visual signals with a camera, or a touch screen. As yet another example, client computing device 440 may be a desktop computing system including a keyboard, mouse, camera and other input devices.

In some examples, client computing device 420 may be a mobile phone used by a passenger of an autonomous vehicle. In other words, user 422 may represent a passenger or a scheduler as discussed herein. In addition, client computing device 430 may represent a smart watch for a passenger of an autonomous vehicle. In other words, user 432 may represent a passenger or a scheduler as discussed herein. The client computing device 440 may represent a workstation for an operations person, for example, a remote assistance operator or other operations personnel who may provide remote assistance to an autonomous vehicle and/or a passenger. In other words, user 442 may represent an operator (e.g., operations person) of a transportation service utilizing the autonomous vehicles 100, 100A, 100B. Although only a few passengers, schedulers and operations persons are shown in FIGS. 4 and 5, any number of such passengers and remote assistance operators (as well as their respective client computing devices) may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of computing devices 110, 410, 420, 430, 440, etc.

Storage system 450 may store various types of information as described in more detail below. For example, the storage system may store a version of the map information, including the map information 200 described above. The storage system may also store metrics for quantifying the quality of or how good a particular location is for a pick up or drop off The metrics may be combined into a discrete value for each parking area in the map information. For example, value could be a discrete value which is determined from a combination of the various metrics and may be used by the server computing device 410 to select one pullover location over another.

Such metrics may include curb occupancy which may define whether there will be an available curb space or not, and not necessarily what objects occupy the curb.

Another metric may include the likelihood of unparking vehicles and/or the duration of vehicles parking in a particular pullover location. This value may suggest where vehicles are parking and unparking most often and like the curb occupancy can be determined from observations of vehicles parking and unparking as well as how long vehicles have been parked at the pullover location (i.e., how long vehicles of the fleet have been parked there).

Another metric may include road geometry or rather the drivable width of a road adjacent to the pullover location. For instance, some pullover locations may be associated with narrower roads where vehicles park on both sides of the street, cul-de-sacs or blind corners where it may be difficult to park truly perpendicular to a curved curb, etc.

Another metric may include how likely a pullover location is to cause inconvenience to other road users. For example, this input may take into account whether another vehicle could move around, and if they do, whether that would require the other vehicle to cross yellow lines, etc.

Another metric may include bicycle traffic or the presence of bike lanes or bicyclists. It may be desirable to avoid parking in areas with bike lanes for safety reasons.

Another metric may include traffic conditions which may be determined based on historical observations or traffic data, real time traffic feeds, etc. This may include discrete determinations such as the average speed on the road adjacent to a pullover location, the ratio of average speed to speed limit, volume of traffic (vehicles/h), and occupancy percentage as a measure of congestion).

Another metric may include legal restrictions which may involve whether a vehicle is able to park in a particular pullover location or if it is reserved for emergencies only.

Another metric may include the history of pullovers by autonomous vehicles for a pullover location. This information may include whether such vehicles had to double-park, parked awkwardly (e.g., steep angles relative to the curb), blocked driveways, parked close to other objects (other vehicles, cones, vegetation, etc.), had to parallel park, received a parking ticket (e.g., a parking violation), blocked or otherwise inconvenienced other traffic, etc.

Another metric may include the volume of parked or moving emergency vehicles near a pullover location. For example, when emergency vehicles are consistently and constantly moving in and out of a specific area, it may be preferable to route around or avoid parking in such areas. In this way, the vehicles can avoid blocking or having to allow such emergency vehicles to pass.

Another metric may include the feasibility of parking in a pullover location. For example, given the geometry of a pullover location, it may be too small or too narrow for a particular class of vehicle.

Another metric may include simulation results. For example, simulations may be run to determine how a vehicle would park in the pullover location. This could be achieved by using logged data from our prior driving and simulating how vehicles would have pulled over either in the original pickup and drop off locations, or other random locations in simulation.

Another metric may include human input. For instance, a pullover metric, which can be generated by surveys about passenger experience during trips (e.g., star ratings or other feedback) or human labeling of logged data from vehicles pulling over, can be used to measure how good a particular pullover location is.

Another metric may include the average length of time a pullover at this location generally takes. For instance, if pickups or drop offs at a given pullover location are generally quick, the impact of other inputs might be weighted differently.

Another metric may include the accessibility of a pullover location. Accessibility may relate to how easy a pullover location is to access for handicapped persons, persons with mobility issues, persons with vision and/or hearing issues, or other disabilities. This may include whether there are nearby accessible curbs, the general ease of walking in the vicinity such as whether there are ramps or steps, etc.

In addition, the storage system 450 may store log data. This log data may include data generated by the various systems of a vehicle, such as an autonomous vehicle, while the vehicle is being operated in a manual driving mode or an autonomous driving mode. For instance, the log data may include sensor data generated by a perception system. As an example, the sensor data may include raw sensor data as well as labels identifying defining characteristics of perceived objects such as shape, location, orientation, speed, etc. of objects such as vehicles, pedestrians, bicyclists, vegetation, curbs, lane lines, sidewalks, crosswalks, buildings, etc. Thus, the log data may also include the trajectories of paths that objects including road users such as other vehicles and bicyclists have taken over time. For example, a ground truth or observed trajectory of an object may include a series of locations and times (e.g., date stamps) and corresponding observer characteristics for that object such as speed, heading, orientation, etc. for each of those locations. In some instances, this log data may include sensor data that identifies locations that are particularly well lit (e.g., lighting conditions), have curb cuts, wheelchair access locations, etc.

The storage system 450 may also store user account information. The account information may include credentials (e.g., a user name and password as in the case of a traditional single-factor authentication as well as other types of credentials typically used in multi-factor authentications such as random identifiers, biometrics, etc.) that can be used to identify a user and/or the user's client computing device to the one or more server computing devices. In addition, account information may also include personal information such as the user's name, contact information, identifying information of the user's client computing device (or devices if multiple devices are used with the same user account), as well as trip information (e.g., scheduled, current and past trip information) for the user.

Figure 6:
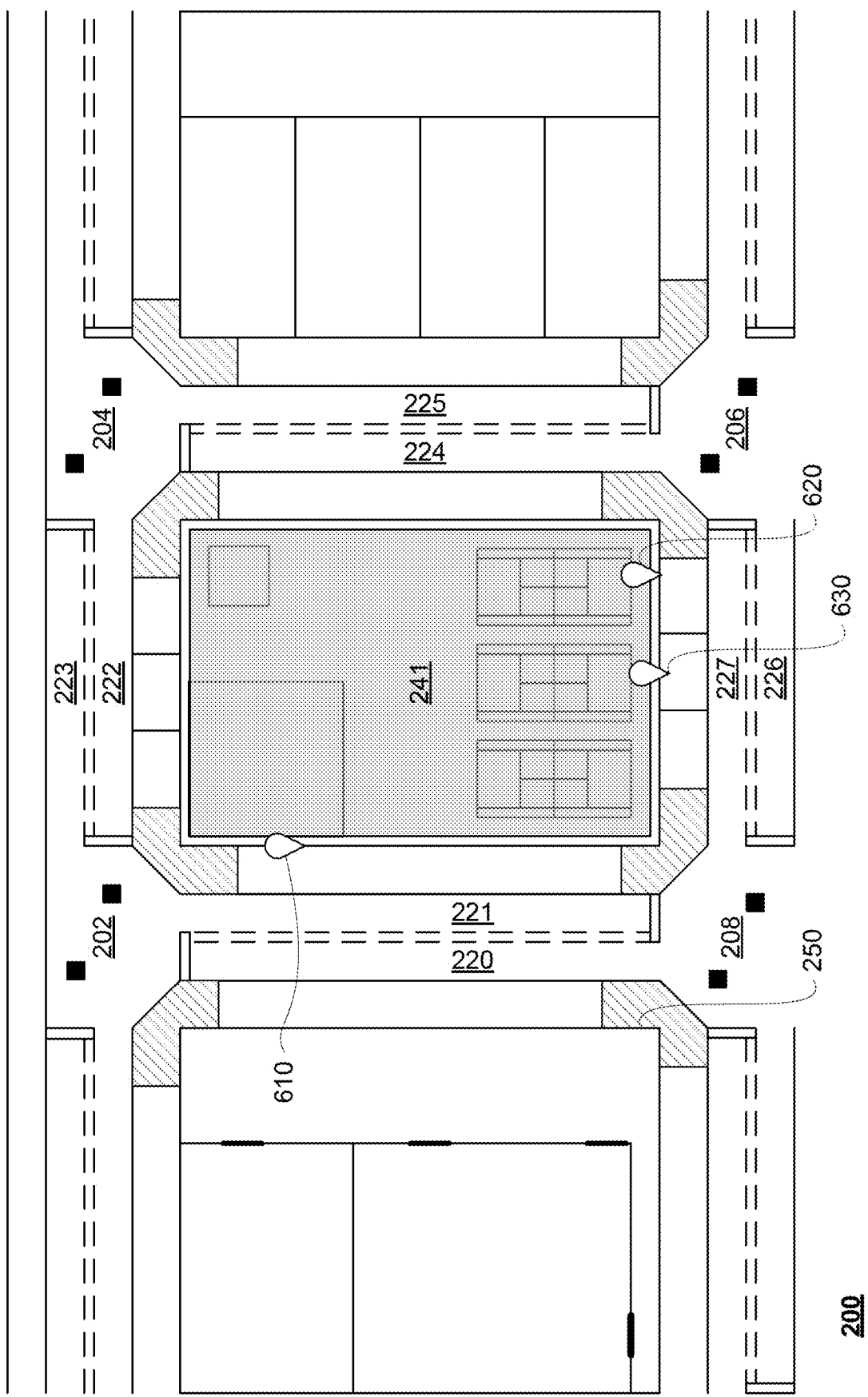
FIG. 6 is an example of map information and data in accordance with aspects of the disclosure.

In this regard, storage system may also store historical trip data. This historical trip data may include information and statistics about trips including information scheduling trips, dates times, pickup and drop off locations, as well as more specific details about pickups and drop offs as well. For instance, the historical trip data may include information identifying whether users have requested a particular pickup location or destination location and adjusted the pick up or drop off location at different points around the requested location or were dropped off at different points. For example, FIG. 6 provide an example of the map information 200 and identifies a pickup location for a trip taken by a passenger. In this example, a passenger may have requested to be picked up at the park 241, for example, by identifying the park 241 in a search field on the passenger's client computing device. In this example, the passenger may have "moved" the pickup location from location 610 to location 620 (for example, by tapping and dragging on a marker or tapping on the location 610 on a map displayed on a client computing device, such as client computing device 420, and dragging or otherwise moving the marker to location 620). In addition, the location 630 may represent the actual location where an autonomous vehicle (such as autonomous vehicle 100) stopped to pick up the passenger on this trip. Again, although not show, the trip information may also include additional details such as the route taken, the destination location, time information, and so on.

The historical trip data may also include information identifying whether passengers provide both high and low ratings (e.g., star ratings or other feedback) for pickup and drop off experiences for different pick and drop off locations. For example, during or after completing the trip represented by FIG. 6, the passenger may have provided feedback (e.g., 4 out of 4 stars or 10 out of 10 as a satisfaction score) for the pickup at location 630.

The historical trip data may also include information identifying how long pickup and drop offs took at different pickup and drop off locations for different points of interest. For example, the pickup at location 630 may have taken 1 minute to complete once the autonomous vehicle stopped at the location 630, the passenger entered the autonomous vehicle, and the passenger initiated the trip (e.g., by hitting a "start trip" or "go" button, speaking a verbal command such as "let's go!", or via other similar methods).

Figure 7:
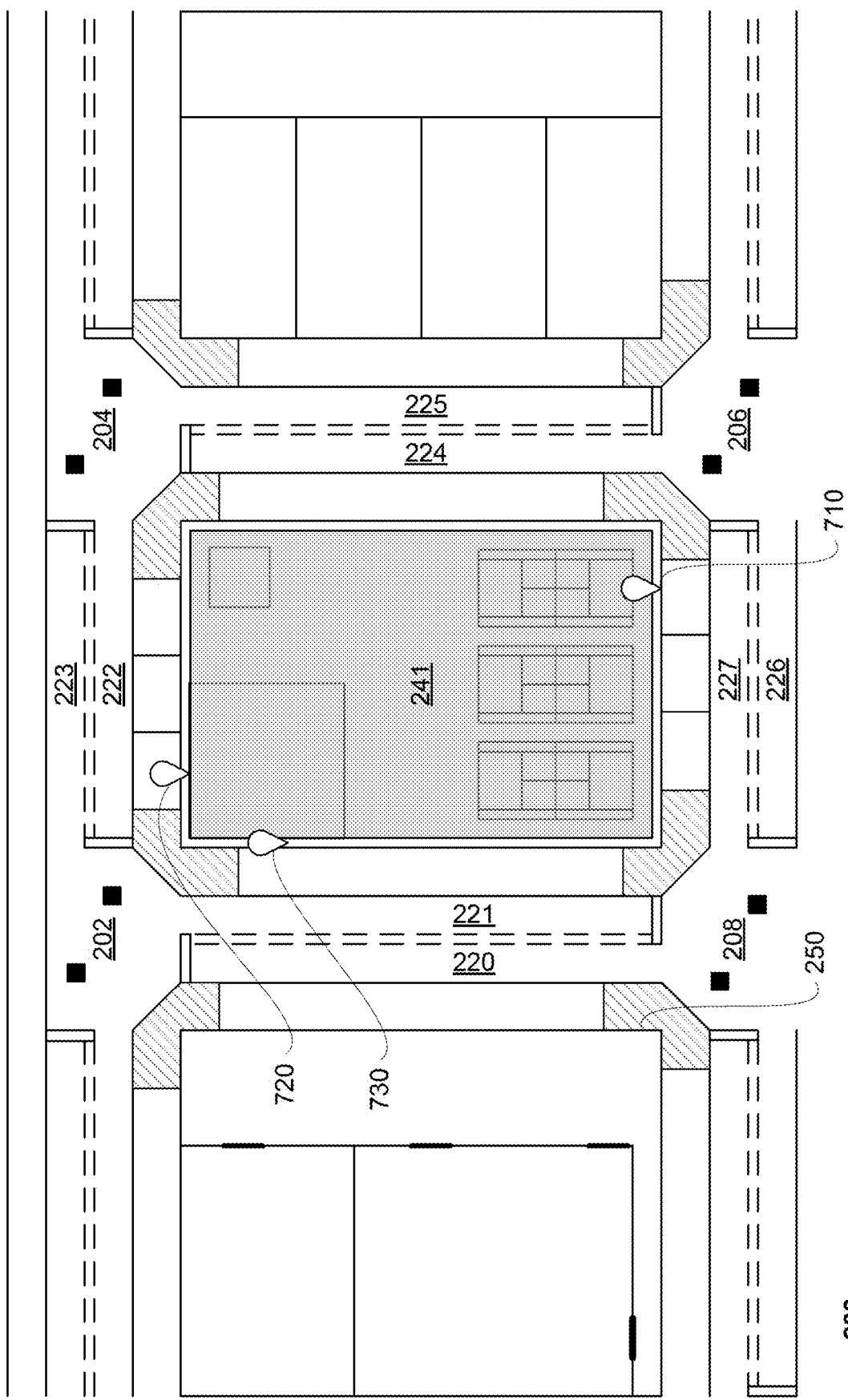
FIG. 7 is an example of map information and data in accordance with aspects of the disclosure.

The historical trip data may also include information identifying which pickup and drop off locations most often requested by users for a given point of interest. For example, turning to FIG. 7, for passengers requesting pickups and drop offs at the park 241, the historical trip data may identify locations 710, 720 and 730 as the most often requested pickup and drop off locations for trips.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 11:
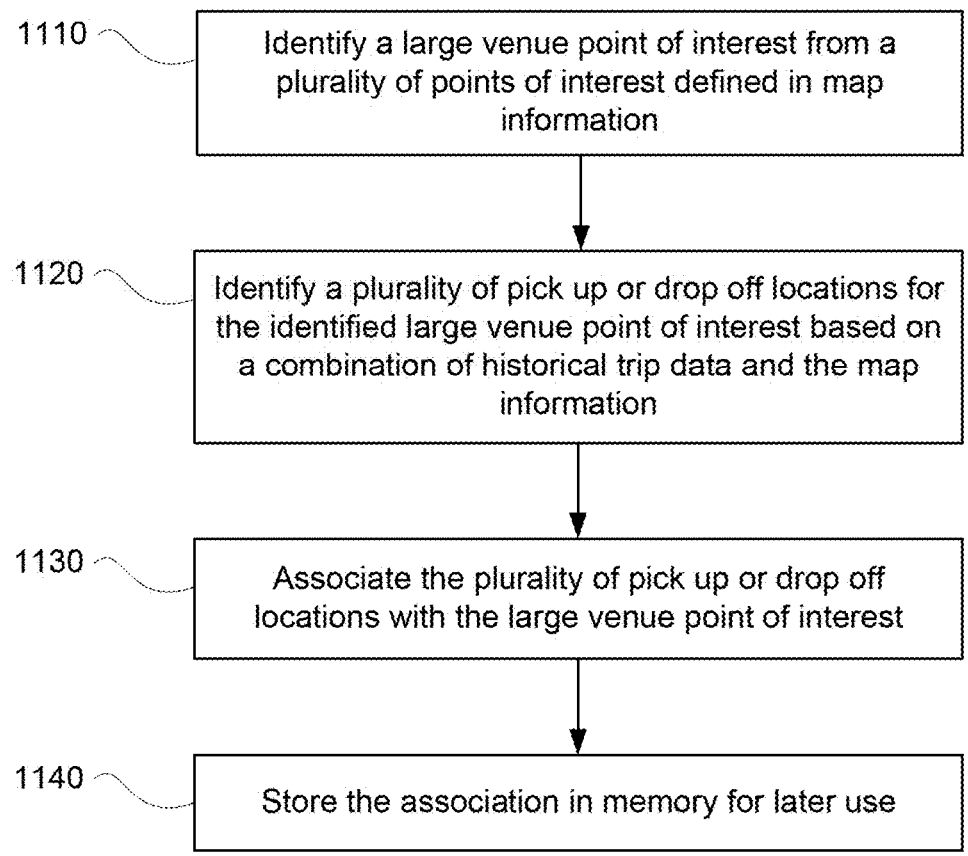
FIG. 11 is an example flow diagram in accordance with aspects of the disclosure.

FIG. 11 provides an example flow diagram 1100 for generating a model for identifying a plurality of pick up or drop off locations for a large venue point of interest, which may be performed by one or more processors, such as the one or more processors of the server computing devices 410. As shown in block 1110 a large venue point of interest is identified from a plurality of points of interest defined in map information. For example, the points of interest defined in the map information, as discussed above, that have certain categorizations may be identified by the server computing devices 410 as large venue points of interest. Such categorizations may include those that are likely to be associated with multiple possible pick up and drop off locations including shopping centers, large parks, airports, malls, neighborhoods, etc. In this regard, using the example of the map information 200, both the shopping center 240 and the park 241 may be identified as having such categorizations and therefore may be identified as large venue points of interest.

In still other instances, the server computing devices 410 may identify points of interest associated with bounding and/or internal polygons of a particular size or dimensions as well as those including those having a plurality of businesses as large venue points of interest. For instance, bounding and/or internal polygons that are greater than some minimum threshold value area may be identified as large venue points of interest. Such a minimum threshold value area may be measured in square meters or square feet. For example, a minimum threshold value area may be 100,000 square meters, 250 square meters, 500,000 square meters or more or less. In this regard, using the example of the map information 200, both the shopping center 240 and the park 241 may be identified as being associated with large bounding polygons and therefore may be identified as large venue points of interest. Similarly, the shopping center 240 may be identified as being associated with a plurality of businesses and therefore may be identified as a large venue point of interest.

Other large venue points of interest may be identified by the server computing devices 410 based on the historical trip data stored in the storage system 450. In this regard, the server computing devices 410 may access and analyze the historical trip data in order to identify large venues. For instance, large venue points of interest may also be identified based on whether users have requested a particular pickup location or destination location and adjusted the pick up or drop off location at different points around the requested location or were dropped off at different points such as in the example of FIG. 6. For another instance, large venue points of interest may also be identified based on whether passengers provide both high and low ratings for pickup and drop off experiences (e.g., star ratings or other feedback) very close to the same location as this might suggest that some users were dropped off or picked up farther or closer to the desired location.

Returning to FIG. 11, at block 1120, a plurality of pick up or drop off locations for the identified large venue point of interest are identified based on a combination of historical trip data and map information. Once the large venue points of interest are identified, a plurality of pick up or drop off locations may be identified or selected. The plurality of pick up or drop off locations for a given large venue point of interest may be identified based on the historical trip data. For example, pickup and drop off locations for a given large venue point of interest with higher user ratings (e.g., for lighting conditions, walking distance, safety, etc.) may be identified. In addition, or alternatively, pickup and drop off locations for the given large venue point of interest which resulted in the fastest pickups and drop offs or those that were least difficult or complicated for the autonomous vehicles in the past may be identified. Such information may be valued, assigned a level, or quantized on a scale, such as zero to 1, one being most difficult. In addition, or alternatively, pickup and drop off locations most often requested by users for a given large venue point of interest may be identified.

The plurality of pick up or drop off locations for a given large venue point of interest may be identified based on the map information. For instance, the server computing devices 410 may access and analyze the map information 200 to identify pickup and drop off locations for a particular identified large venue point of interest. For example, pickup and drop off locations closest to each edge of a bounding polygon or internal polygon may be selected. In this regard, for the shopping center 240, parking areas 290, 291, 292 may be identified as being closest to respective sides of the polygon 250 and/or polygon 260. Similarly for the park 241, parking areas 280, 281, 282, 283, 284, 285, 286, 287 may be identified as being closest to respective sides of one or more of polygons 251, 262, 263, 264, 265, 266.

In other examples, parking areas closest to designated areas in the map information, such as congestion zones, loading zones, drop off or pick up zones (e.g., for airports or train stations), associated with each of the identified large venue points of interest may be identified.

In still other examples, pickup and drop off locations may be identified based on proximity to known building entrances, curb cuts, etc. In this regard, for the shopping center 240, parking areas 290, 291, 292 may be identified as being proximate to building entrances 270, 272, 271.

Similarly, the plurality of pick up or drop off locations for a given large venue point of interest may be identified based on sensor data generated by perception systems of the autonomous vehicles. For example, as noted above sensor data stored in log data of the storage system 450 may identify locations that are particularly well lit (e.g., lighting conditions), have curb cuts, wheelchair access locations, etc.

In addition, the plurality of pick up or drop off locations for a given large venue point of interest may be determined based on metrics for quantifying the quality of or how good a particular location is for a pick up or drop off. In this regard, the server computing devices 410 may access such information from the storage system 450 in order to identify pickup and drop off locations.

The number of pickup and drop off locations identified for the plurality may be limited. Such limits may be based on characteristics such as the number of sides of the polygons (e.g. bounding or building footprints), the walking or other distances between the identified pick up or drop off locations (e.g. too many choices too close together may not be helpful to a user), attributes of the large venue point of interest (e.g. an airport may have a fixed number of doors for pickups for arrivals, a fixed number of doors for drop offs for departures, a fixed number of different terminals, as well as designated areas for ride sharing, car rentals, etc.), walking distances to known locations within the polygon (e.g. walking distance between terminals or from a terminal to a tram/bus between terminals in an airport, different features within a rental car facility, etc.), the number of known access points (e.g. building entrances, businesses or other landmarks within the large venue point of interest, designated locations for the transportation service to pick up or drop off passengers), clustering logic based on distance such as those utilizing hierarchical clustering like agglomerative clustering, and so on. For example, a collection of multiple pick up and drop off locations may be clustered together and consolidated until some predefined clustering metric is reached. Such a metric can be hand-tuned to a number that is appropriate for the given point of interest based on some manually defined examples or some other numerical limit. In some instances, such characteristics may be inferred or determined based on other characteristics. For example, the number of entrances to a larger building (i.e., a larger internal polygon for a building footprint) may be inferred based upon the number of businesses associated with the large venue point of interest.

For example, returning to the example of the park 241, because polygon 251 has four sides, the number of pickup or drop off locations may be limited to four. In this regard, parking areas 280, 281, 282, 283, 284, 285, 286, 287 may be reduced down to parking areas 280, 281, 284, 285, or rather, one parking area corresponding to each side of the polygon 251. As an example, parking area 285 may be identified over parking areas 286 and 287 for the "bottom edge" of the polygon 251 (closest to lane 227) as, referring to FIG. 6, parking area 281 corresponds to location 620 and is a location to which users have moved a pickup or drop off location according to the historical trip data. Similarly, parking area 282 may be identified over parking areas 282 and 283 for the "top edge" of the polygon 251 (closest to lane 222) as, referring to FIG. 7, parking area 281 corresponds to location 720 and is more often requested for pickup and drop off locations for trips than parking areas 282 and 283 according to the historical trip data or for example, because these parking areas minimize walking through a parking lot and minimize the distance to the entrances of a point of interest to which the passenger is traveling.

Figure 8:
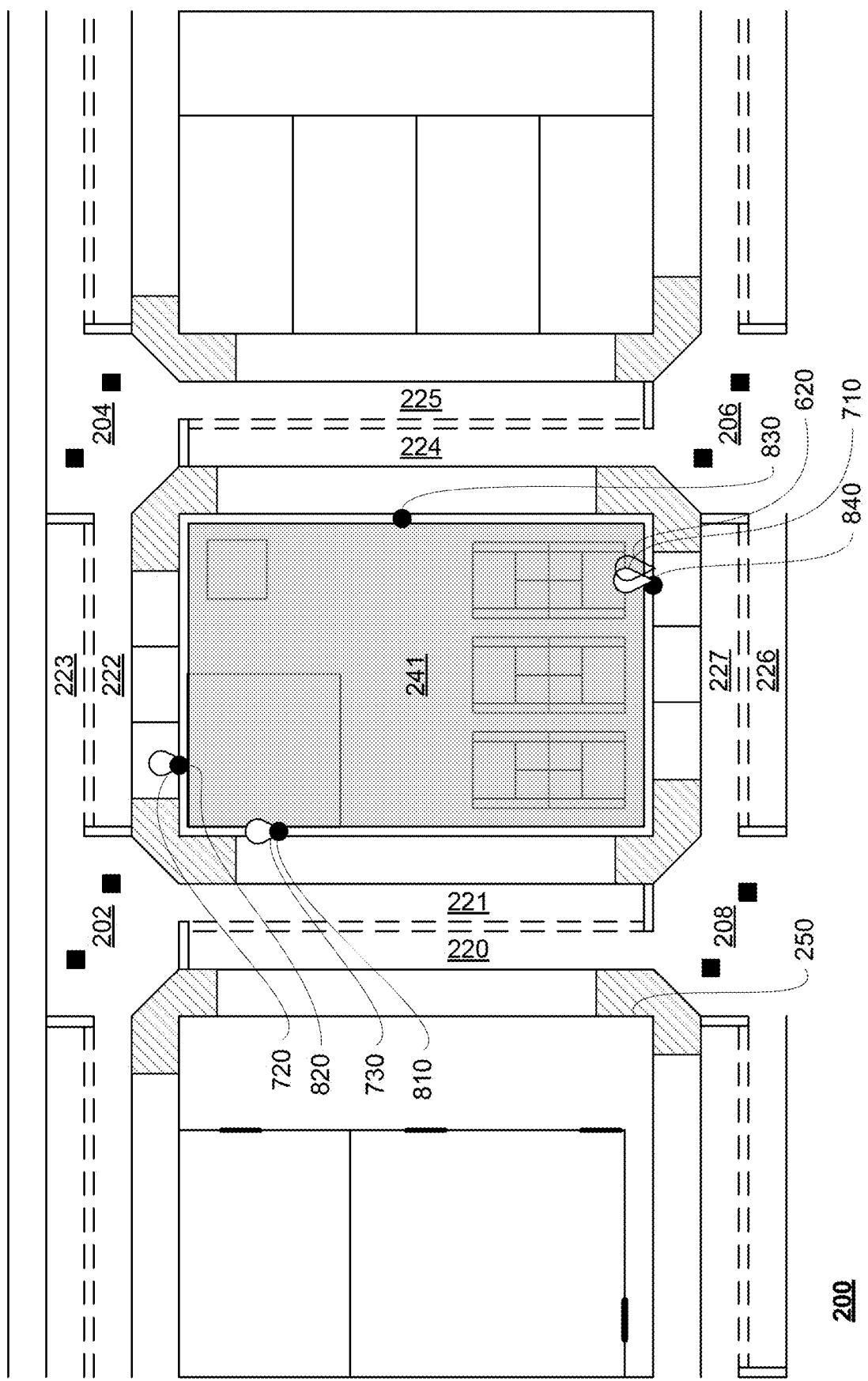
FIG. 8 is an example of map information and data in accordance with aspects of the disclosure.

FIG. 8 represents the identified pickup or drop off location for the park 241. In this example, the identified pickup and drop off locations are represented by markers (dots) 810, 820, 830, 840 corresponding to the parking areas 280, 281, 284, 285, respectively. For reference, locations 710, 720, 730 and location 620 are displayed. In this example, the identified pickup and drop off location within the parking area 280 may be positioned at the location of the marker 810 because within the parking area 280, location 730 was a most often requested pickup or drop off location. Similarly, the identified pickup and drop off location within the parking area 284 may be positioned at the location or marker 830 or the center of the parking area 284 because there may not be any other relevant information for the server computing devices 410 to position the marker.

Returning to FIG. 11, at block 1130, the plurality of pick up or drop off locations are associated with the large venue point of interest. For example, each of the parking areas 290, 291, 292 may be associated with the shopping center 240, and each of the parking areas 280, 281, 284, 285 may be associated with the park 241.

At block 1140, the association is stored in memory for later use. This plurality of pick up or drop off locations may be associated with the large venue point of interest and saved in the map information. In this regard, the server computing devices 410 may associate the plurality of pickup or drop off location with the large venue point of interest and store this association with the map information (e.g., in the storage system 450).

This information may then be used to facilitate trips for the transportation service. For instance, a user may download an application for requesting a vehicle to a client computing device. For example, users 422 and 432 may download the application via a link in an email, directly from a website, or an application store to client computing devices 420 and 430. For example, a client computing device may transmit a request for the application over the network 460, for example, to one or more server computing devices 410, and in response, receive the application. The application may be installed locally at the client computing device.

A user, such as user 422, may input a destination location for a trip into a client computing device, such as client computing device 420, via an application, and the application may send a signal identifying the destination location to one or more server computing devices 410. This destination location may be defined as an address, a name (e.g., a business name), a type of business (e.g., a hardware store), etc. In some instances, the user may also identify one or more intermediate destinations in a similar manner.

The user may also specify or otherwise provide a pickup location at which a vehicle can pick up the user. As an example, a pickup location can be defaulted to a current location of the passenger's client computing device, but may also be a recent, suggested, or saved location near the current location associated with the user's account. The user may enter an address or other such information, tap a location on a map or select a location from a list in order to identify a pickup location. For instance, the client computing device 420 by way of the application may send its current location, such as a GPS location, and/or a name, address or other identifier for the pickup location to the one or more server computing devices 410 via network 460. In this regard, the user may share his or her current location (or other information such as accelerometer or gyroscope information generated by such devices at the client computing device) with the server computing devices 410 when using the application and/or requesting a vehicle for a trip.

The server computing devices 410 may receive the destination location and/or pickup location and may determine whether these locations correspond to a large venue point of interest associated with a stored plurality of pickup or drop off locations. If not, the server computing devices 410 may default to the closest pickup or drop off location to the point of interest or some other default pickup or drop off location based on various criteria such as walking cost (as opposed to linear distance) which can include walking distance, walking difficulty (like need to climb a hill or stair or cross the street), walking safety level, etc. If not, the server computing devices 410 may identify any associated plurality of pickup or drop off locations and provide this information to the user's client computing device for display to the user.

In this regard, once a user requests a trip from or to a large venue point of interest associated with such a plurality, the user's client computing device may be provided with a list of pick up or drop off location options for that large venue point of interest. The options may be provided with a map and a scrollable list of options where each spot includes a name, image (if available), and attributes that a user can browse and select from. In this regard, for the same large venue, a user may be provided with a list of the "best" pickup and drop off locations.

The aforementioned attributes may include information identifying the benefits of each location (e.g., shortest walk to the large venue point of interest, fastest drop off, etc.). In this regard, the attributes may include contextual information about how each location may affect the passenger's trip in the form of routing or timing information, such as an estimated time of arrival for a pickup up and/or later drop off, walking times and/or paths (e.g., represented as dashed-lines) to reach a particular location within the venue (e.g., 2 minutes after drop off to reach the closest entrance to a building via a particular path), etc. In addition, or alternatively, additional information such as street-level images (such as those captured by the perception systems of the autonomous vehicles) or 3D models of the area around the large venue point of interest may also be provided.

Figure 9:
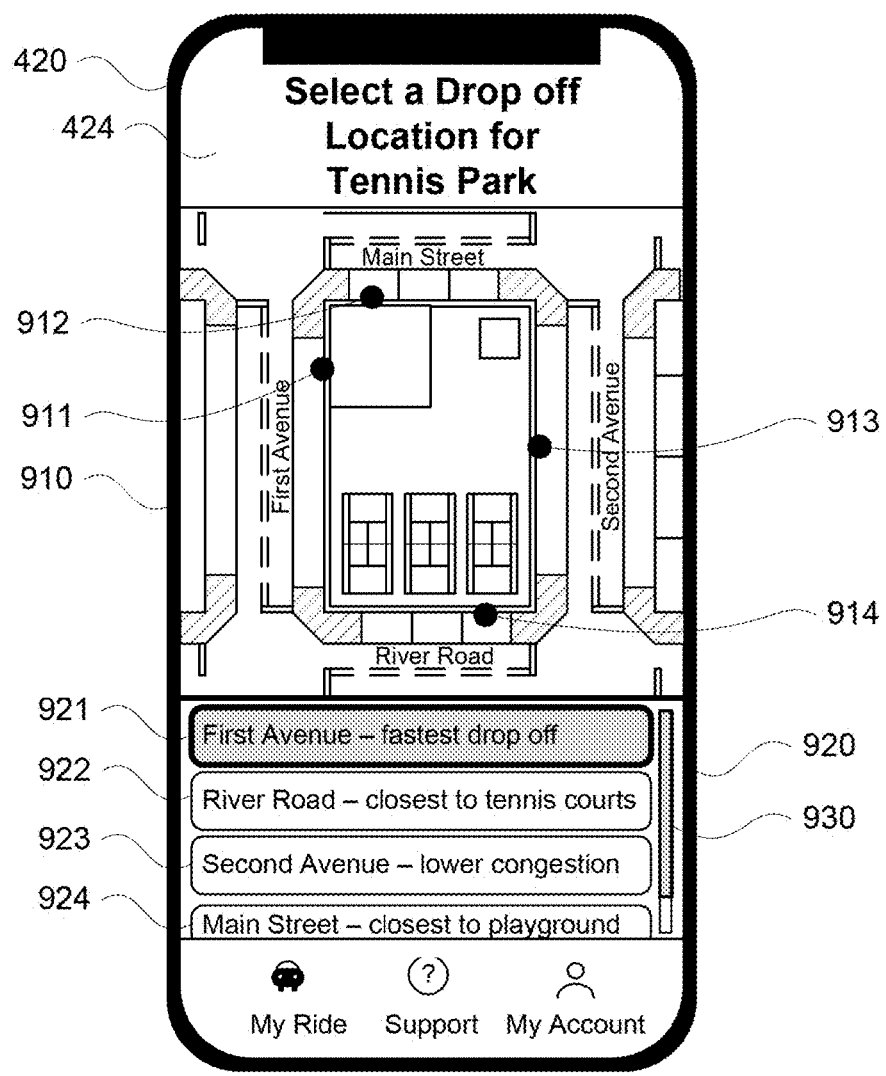
FIG. 9 is an example of a client computing device and displayed information in accordance with aspects of the disclosure.

For example, FIG. 9 provides an example of the client computing device 420 and display 424. In this example, the user may have input information identifying the park 241. In response, the server computing devices 410 may provide map information which enables the client computing device (e.g., via the application) to display a map 910 (including the area of the park 241) as well as a list of drop off options 920 corresponding to the pickup or drop off locations associated with the park 241. The map also includes a plurality of markers 911, 912, 913, 914 (dots) corresponding to each of the drop off locations for a trip. In this example, the list of drop off options 920 includes drop of option 921 for First Avenue (corresponding to parking area 280 and marker 810), drop of option 922 for River Road (corresponding to parking area 285 and marker 840), drop of option 923 for Second Avenue (corresponding to parking area 284 and marker 830), and drop of option 924 for Main Street (corresponding to parking area 281 and marker 820). In this example, additional drop off options may be viewed by sliding the options upwards relative to the display 424 or dragging the slider bar 930 downwards relative to the display.

Each of the drop off options of the list of drop off options 920 also includes at least one attribute. For example, the attribute for First Avenue is the fastest drop off which may correspond to the easiest location for the autonomous vehicle to park. The attribute for River Road is the closest to the tennis courts or rather the inner polygons for the tennis courts within the park. The attribute for Second Avenue is lower congestion or lower traffic which may be potentially safer for dropping off passengers who may be traveling with children or other passengers who may need additional time to exit the autonomous vehicle. The attribute for Main Street is closest to the playground or rather the inner polygon for the playground within the park. Although this example depicts each drop off option 920 with a single attribute, multiple attributes may be displayed. For example, if First Avenue also includes the shortest walking distance to one or more entrances to the park, the attributes displayed could be "fastest drop off & shortest walking distance" or "shortest walking distance—2 minutes walking time."

Figure 10:
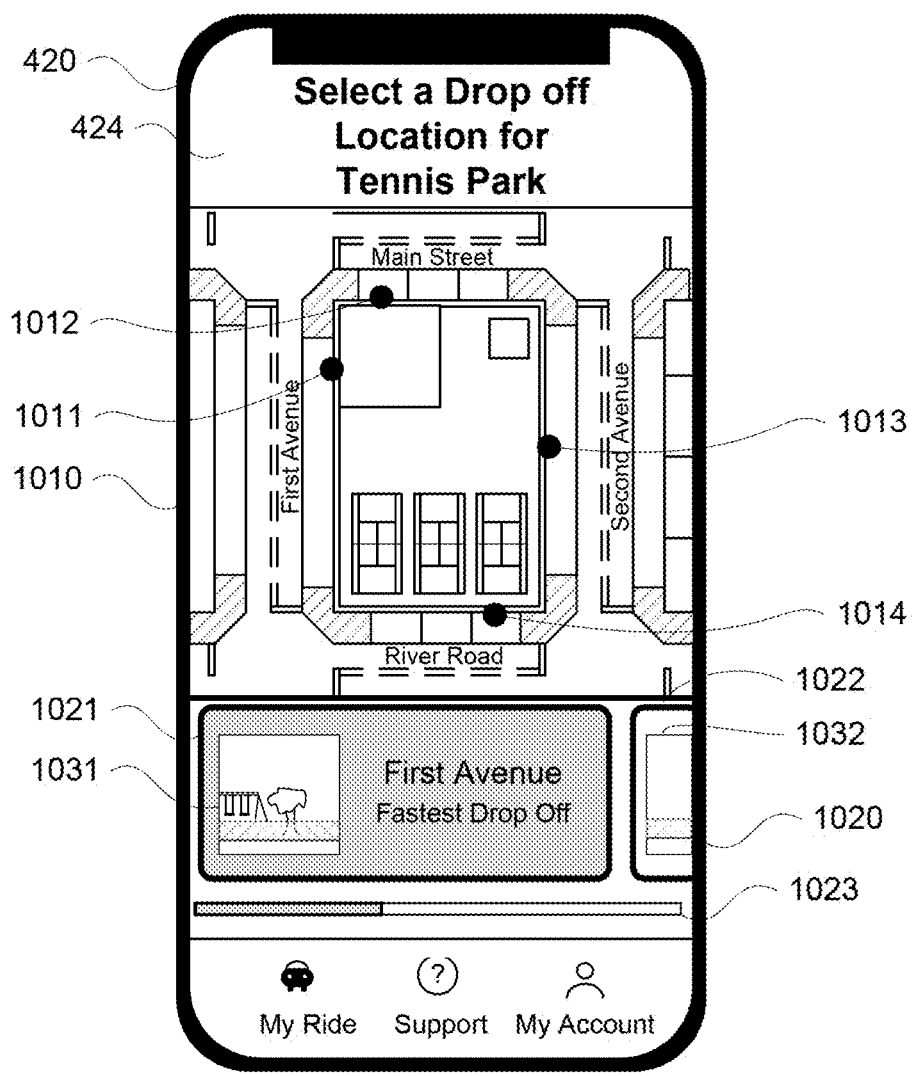
FIG. 10 is an example of a client computing device and displayed information in accordance with aspects of the disclosure.

For another example, FIG. 10 provides an example of the client computing device 420 and display 424. In this example, as with the Example of FIG. 9, the user may have input information identifying the park 241. In response, the server computing devices 410 may provide map information which enables the client computing device (e.g., via the application) to display a map 1010 (including the area of the park 241) as well as a list of drop off options 1020 corresponding to the pickup or drop off locations associated with the park 241. The map also includes a plurality of markers (dots) 1011, 1012, 1013, 1014 corresponding to each of the drop off locations for a trip. In this example, the list of drop off options 1020 includes drop off option 1021 for First Avenue (corresponding to parking area 280). A second drop off option 1022 is only partially visible. In this regard, additional drop off options may be viewed by sliding the options to the left of the display 424 or dragging the slider bar 1023 to the right of the display. As such, in this example, rather than the vertical list presented in FIG. 9, the list of drop off options 1020 in FIG. 10 is depicted in a horizontal list. As shown, the server computing devices 410 may provide the client computing device with images of each of the parking areas (if available) which can be displayed with each respective option. In this regard, the drop off option 1021 includes an image 1031 (e.g., a street level image) of the parking area 280. Although only partially visible in the example, the drop off option 1022 includes an image 1032 (e.g., a street level image) of the corresponding parking for drop off option 1022. Such images may also be stored in the storage system 450.

In some instances, the server computing devices 410 may identify a preferred, best or default pickup or drop off location. For example, the server computing devices 410 may select a parking area of the pickup or drop off locations associated with a large venue point of interest that is closest to the user's client location and/or has the shortest walking distance. This information may also be sent to the user's client computing device. As another example, the server computing devices 410 may select a parking area of the pickup or drop off locations associated with a large venue point of interest based on user's preference or accessibility needs (e.g., always defaulting to closest drop off or same side of the street drop off for low-vision riders). Such information may be stored in the storage system 410 with the user's account information). In this regard, when displaying the list of pick up or drop off locations for a large venue point of interest, the selected pickup or drop off location may be highlighted or otherwise identified. For example, referring to FIG. 9, the drop off option 921 may be identified as the fastest drop off and therefore may be determined to be a preferred drop off location by the server computing devices. In this regard, the drop off option 921 is depicted as highlighted (here, shaded) while the other drop off options 922, 923, 924 are not highlighted. Similarly, referring to FIG. 10, the drop off option 1021 may be identified as the fastest drop off and therefore may be determined to be a preferred drop off location by the server computing devices. In this regard, the drop off option 1021 is depicted as highlighted (here, shaded) while the other drop off options 1022 (including those not visible on the display 424) are not highlighted.

In some instances, if the destination location or pickup location provided by the user is a larger area which encompasses a plurality of points of interest, rather than selecting one of the points of interest and displaying the associated plurality of pickup or drop off locations, the server computing devices may identify the plurality of points of interest and display these as a list with a corresponding map. In this regard, the user may be able to select one of the points of interest and thereafter select a pick up or drop off location.

In response to receiving the pickup location, destination location and any intermediate destination locations, the server computing devices 410, may request the user to confirm the trip (e.g., confirm the details of the trip). Once confirmation is received from the client computing device 420, the server computing devices 410 may dispatch an autonomous vehicle to pick up the user 422 and complete the trip. To do so, the server computing devices 410 may first select an autonomous vehicle, for instance based on proximity to the pickup location and/or availability, and assign the autonomous vehicle to the user for the trip. For example, the server computing devices 410 may determine that the autonomous vehicle 100 is available and closest to the location of the passenger (user 422). The server computing devices may then send a signal (e.g., dispatching instructions) to the autonomous vehicle in order to cause the autonomous vehicle to travel to the pickup location, destination location and any intermediate destination locations in order to pick up the passenger and transport the passenger to the destination. Once the autonomous vehicle is dispatched, the autonomous vehicle's perception system (e.g., cameras or other sensors) may be used to determine the validity (i.e., whether it is possible for a vehicle to stop there) of the pickup or drop off location and report this to the server computing devices accordingly.

As noted above, the features described herein may enable users of an autonomous vehicle transportation service to select one of a plurality of pickup and/or drop off locations for large venues. In addition, the features described herein may enable an automated process for such efforts thereby increasing efficiency and usefulness of the information. For instance, in addition to the information presented to passengers on client computing devices, the information about large venues may be used to optimize our service for more timely pickups and drop offs of passengers (or potentially goods). Additional benefits may include shorter estimated time of arrivals for pickups and destination, shorter walking times, shorter waiting times for autonomous vehicles during a pickup or drop off, stopping for pickups and drop offs closer to entrances, exits, curb cuts, within well-lit and in some instances more highly-trafficked (e.g., by pedestrians) and which are potentially safer. Although the examples above relate to fixed large venue points of interest stored in the map information, in some instances, the identified large venue points of interest may be transitory. For example, large venue points of interest corresponding to concerts, festivals, street parades and fairs where entrances and designated spots may change depending on event and time may also be identified. Once identified, pickup and drop off locations may also be identified, associated with the transitory large venue point of interest, and stored for later use as described above.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only some of many possible embodiments. Further, the same reference numbers in different drawings can identify the same or similar elements.

The invention claimed is:

1. A method comprising:
    identifying, by one or more processors of one or more server computing devices, a large venue point of interest from a plurality of points of interest defined in map information based on a size of a polygon associated with the large venue point of interest in the map information;
    identifying, by the one or more processors, a plurality of pick up or drop off locations based on a distance between historical pick up or drop off locations and a side of the polygon;
    receiving, from a client computing device, a request for a trip identifying the large venue point of interest;
    providing, by the one or more processors, the identified plurality of pick up or drop off locations to the client computing device in response to the request; and
    dispatching, by the one or more processors, an autonomous vehicle in order to complete the trip.

2. The method of claim 1, wherein the large venue point of interest is further identified based on a categorization of the large venue point of interest in the map information.

3. The method of claim 1, wherein the polygon includes a building footprint.

4. The method of claim 1, wherein the polygon is a bounding polygon for the large venue point of interest.

5. The method of claim 1, wherein the large venue point of interest is further identified based on historical trip data including whether users have requested a particular pick up location or destination location for the large venue point of interest and the users moved the particular pick up or destination location.

6. The method of claim 1, wherein the large venue point of interest is further identified based on historical trip data including ratings for pick up and drop off experiences for the large venue point of interest, and wherein the large venue point of interest is further identified based on the ratings.

7. The method of claim 6, wherein the ratings relate to walking distance.

8. The method of claim 6, wherein the ratings relate to lighting conditions.

9. The method of claim 1, wherein identifying the plurality of pick up or drop off locations is further based on timing of pickups or drop offs at the historical pickup or drop off locations.

10. The method of claim 1, wherein identifying the plurality of pick up or drop off locations is further based on a level of difficulty for an autonomous vehicle to complete a pick up or drop off at the historical pick up or drop off locations.

11. The method of claim 1, determining a number of pick up or drop off locations to include in the identified plurality of pick up or drop off locations based on characteristics of the polygon.

12. The method of claim 11, wherein the characteristics include a number of sides of the polygon.

13. A system comprising one or more server computing devices having one or more processors configured to:
    identify a large venue point of interest from a plurality of points of interest defined in map information based on a size of a polygon associated with the large venue point of interest in the map information;
    identify a plurality of pick up or drop off locations based on a distance between historical pick up or drop off locations and a side of the polygon;
    receive, from a client computing device, a request for a trip identifying the large venue point of interest;
    provide, to the client computing device, the identified plurality of pick up or drop off locations to the client computing device in response to the request; and
    dispatch an autonomous vehicle in order to complete the trip.

14. The system of claim 13, wherein the one or more processors are further configured to identify the large venue point of interest further based on a categorization of the large venue point of interest in the map information.

15. The system of claim 13, wherein the one or more processors are further configured to identify the large venue point of interest further based on historical trip data including whether users have requested a particular pick up location or destination location for the large venue point of interest and the users moved the particular pick up or destination location.

16. The system of claim 13, wherein the one or more processors are further configured to identify the large venue point of interest further based on historical trip data including ratings for pick up or drop off experiences for the large venue point of interest, and wherein the large venue point of interest is further identified based on the ratings.

17. The system of claim 13, the one or more processors are further configured to identify the plurality of pick up or drop off locations further based on timing of historical pick ups and drop offs.

18. The system of claim 13, wherein the one or more processors are further configured to identify the plurality of pick up or drop off locations further based on a level of difficulty for an autonomous vehicle to complete a pick up or drop off at the historical pick up or drop off locations.

19. The system of claim 13, the one or more processors are further configured to determine a number of pick up or drop off locations to include in the identified plurality of pick up or drop off locations based on characteristics of the polygon.

20. The system of claim 19, wherein the characteristics include a number of sides of the polygon.

21. A non-transitory computer readable medium on which instructions are stored, the instructions, when executed by one or more processors, cause the one or more processors to perform a method of:
- identifying a large venue point of interest from a plurality of points of interest defined in map information based on a size of a polygon associated with the large venue point of interest in the map information;
- identifying a plurality of pick up or drop off locations based on a distance between historical pick up or drop off locations and a side of the polygon;
- receiving, from a client computing device, a request for a trip identifying the large venue point of interest;
- providing, to the client computing device, the identified plurality of pick up or drop off locations to the client computing device in response to the request; and
- dispatching, by the one or more processors, an autonomous vehicle in order to complete the trip.

* * * * *